(12) United States Patent
Park et al.

(10) Patent No.: US 11,884,296 B2
(45) Date of Patent: Jan. 30, 2024

(54) ALLOCATING PROCESSING RESOURCES TO CONCURRENTLY-EXECUTING NEURAL NETWORKS

(71) Applicant: QUALCOMM Incorporated, San Diego, CA (US)

(72) Inventors: Hee Jun Park, San Diego, CA (US); Abhinav Goel, Lafayette, IN (US)

(73) Assignee: QUALCOMM Incorporated, San Diego, CA (US)

( * ) Notice: Subject to any disclaimer, the term of this patent is extended or adjusted under 35 U.S.C. 154(b) by 533 days.

(21) Appl. No.: 17/128,554

(22) Filed: Dec. 21, 2020

(65) Prior Publication Data
US 2022/0194423 A1  Jun. 23, 2022

(51) Int. Cl.
*B60W 60/00* (2020.01)
*G06N 3/045* (2023.01)
*G06N 3/00* (2023.01)
*G06N 3/042* (2023.01)
*G06N 7/04* (2006.01)

(52) U.S. Cl.
CPC .... *B60W 60/0015* (2020.02); *B60W 60/0013* (2020.02); *G06N 3/002* (2013.01); *G06N 3/042* (2023.01); *G06N 3/045* (2023.01); *G06N 7/046* (2013.01)

(58) Field of Classification Search
CPC ..................................................... G06N 3/045
See application file for complete search history.

(56) References Cited

U.S. PATENT DOCUMENTS

| | | |
|---|---|---|
| 10,503,174 B1 | 12/2019 | Kim et al. |
| 2017/0313419 A1 | 11/2017 | Lemus Martin et al. |
| 2019/0114537 A1 * | 4/2019 | Wesolowski ........... G06N 3/084 |
| 2019/0146507 A1 | 5/2019 | Haynes |
| 2019/0266029 A1 | 8/2019 | Sathyanarayana et al. |
| 2020/0159215 A1 * | 5/2020 | Ding ..................... G06N 3/045 |

FOREIGN PATENT DOCUMENTS

| | | |
|---|---|---|
| CN | 109885392 A | 6/2019 |
| DE | 102012219917 A1 | 6/2014 |

OTHER PUBLICATIONS

Baidya S., et al., "Vehicular and Edge Computing for Emerging Connected and Autonomous Vehicle Applications", 2020 57th ACM/IEEE Design Automation Conference (DAC), IEEE, Jul. 20, 2020 (Jul. 20, 2020), 6 Pages, XP033838120, DOI: 10.1109/DAC18072.2020.9218618 [retrieved on Oct. 8, 2020] abstract sections I, II, IV. (6 pages).
International Search Report and Written Opinion—PCT/US2021/058226—ISA/EPO—dated Feb. 28, 2022 15 pages.

* cited by examiner

*Primary Examiner* — Eric Nilsson
(74) *Attorney, Agent, or Firm* — The Marbury Law Group, PLLC

(57) ABSTRACT

Embodiments include methods performed by a processor of a vehicle for allocating processing resources to concurrently-executing neural networks. The methods may include determining a priority of each of a plurality of neural networks executing on a vehicle processing system based on a contribution of each neural network to overall vehicle safety performance, and allocating computing resources to the plurality of neural networks based on the determined priority of each neural network. In some embodiments, the methods may dynamically adjust hyperparameters of one or more neural networks.

35 Claims, 16 Drawing Sheets

ADAS Functions

| Function | Neural Network |
|---|---|
| Dynamic Rerouting | DenseNet |
| Weather Detection | VGG16 |
| Backward Collision Warning | RESNET50 |
| Forward Collision Prevention | MobileNet |
| Blind Spot Detection | Inception |

FIG. 5B

ADAS Baseline Neural Network Configuration

| Neural Newtork | Quantization Level | Pruning Level | Input Resolution | Inferences Per Second |
|---|---|---|---|---|
| DenseNet | float16 | 0.3 | 720p | 20 |
| VGG16 | float16 | 0.2 | 720p | 20 |
| RESNET50 | float16 | 0.1 | 720p | 20 |
| MobileNet | float16 | 0 | 720p | 20 |
| Inception | float16 | 0 | 720p | 20 |

FIG. 5C

ALLOCATING PROCESSING RESOURCES TO CONCURRENTLY-EXECUTING NEURAL NETWORKS

BACKGROUND

Increasingly, autonomous vehicles (such as autonomous and semi-autonomous cars, drones, mobile robots, and other suitable machines) include multiple sensors to gather information about the environment, as well as processing systems to process the information gathered for route planning, navigation, collision avoidance, etc. One example is an Advanced Driver Assistance System (ADAS) for an autonomous and semi-autonomous car. To enable rapid analysis of the sensor data and quick decision making based on it, the data from each sensor is processed by a neural network, and so the computing systems of the vehicle, such as a system on chip (SOC), execute numerous neural networks concurrently.

SUMMARY

Various aspects include methods that may be implemented in a processing device within a vehicle for allocating computing resources to concurrently-executing neural networks. Various aspects performed by a processor of a vehicle may include determining a priority of each of a plurality of neural networks executing on a vehicle processing system based on a contribution of each neural network to overall vehicle safety performance, and allocating computing resources to the plurality of neural networks based on the determined priority of each neural network.

In some aspects, determining a priority of each of a plurality of neural networks executing on a vehicle processing system based on a contribution of each neural network to overall vehicle safety performance may include determining the priority of each of the plurality of neural networks based on a contribution of each neural network to the overall vehicle safety performance in a vehicle operation context. In some aspects, determining a priority of each of a plurality of neural networks executing on a vehicle processing system based on a contribution of each neural network to overall vehicle safety performance may include determining the priority of each of the plurality of neural networks based on an indication of a contribution of that neural network to the overall vehicle safety performance, wherein the indication is provided by each neural network. In some aspects, the overall vehicle safety performance may be calculated based on a model using inference accuracy and speed of the plurality of neural networks as input values. In some aspects, the overall vehicle safety performance may indicate a quality of drive based on factors that are perceptible by a human passenger, such as to improve the experience of the passenger.

In some aspects, determining a priority of each of the plurality of neural networks executing on the vehicle processing system may include determining a relative performance of one or more of the plurality of neural networks based on an output inferences per second and an output accuracy of each neural network. In some aspects, allocating computing resources to the plurality of neural networks based on the determined priority of each neural network may include adjusting one or more hyperparameters of one or more of the plurality of neural networks based on the determined priority of the one or more the plurality of neural networks. In some aspects, adjusting one or more hyperparameters of one or more of the plurality of neural networks based on the determined priority of the one or more the plurality of neural networks may include adjusting one or more hyperparameters based on a performance-effectiveness curve of one or more of the plurality of neural networks.

Some aspects may further include determining a performance of one or more of the plurality of neural networks using the allocated computing resources, and reallocating computing resources to one or more of the plurality of neural networks based on the determined performance of one or more of the plurality of neural networks. Such aspects may further include monitoring a dynamic availability of the computing resources and an actual usage of the computing resources. In such aspects, reallocating computing resources to one or more of the plurality of neural networks based on the determined performance of one or more of the plurality of neural networks may include reallocating computing resources to one or more of the plurality of neural networks based on the dynamic availability of the computing resources and the actual usage of the computing resources.

In some aspects, reallocating computing resources to one or more of the plurality of neural networks based on the determined performance of one or more of the plurality of neural networks may include readjusting one or more hyperparameters of one or more of the plurality of neural networks based on the determined performance of each of the plurality of neural networks. Some aspects may include determining whether available computing resources have increased, decreased, or remain the same, and adjusting one or more neural network hyperparameters that have a relatively greater effect on overall vehicle safety performance in response to determining that the available computing resources have increased. Such aspects may include adjusting one or more neural network hyperparameters that have a relatively less effect on overall vehicle safety performance in response to determining that the available computing resources have decreased.

Further aspects include a vehicle including a processor configured with processor-executable instructions to perform operations of any of the methods summarized above. Further aspects include a non-transitory processor-readable storage medium having stored thereon processor-executable software instructions configured to cause a processor to perform operations of any of the methods summarized above. Further aspects include a processing device for use in a vehicle and configured to perform operations of any of the methods summarized above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the various embodiments.

FIG. 5B is a table illustrating functions that may be performed by various neural networks according to various embodiments.

FIG. 5C is a table illustrating configurations of hyperparameters of various neural networks according to various embodiments.

DETAILED DESCRIPTION

Figure 1A:
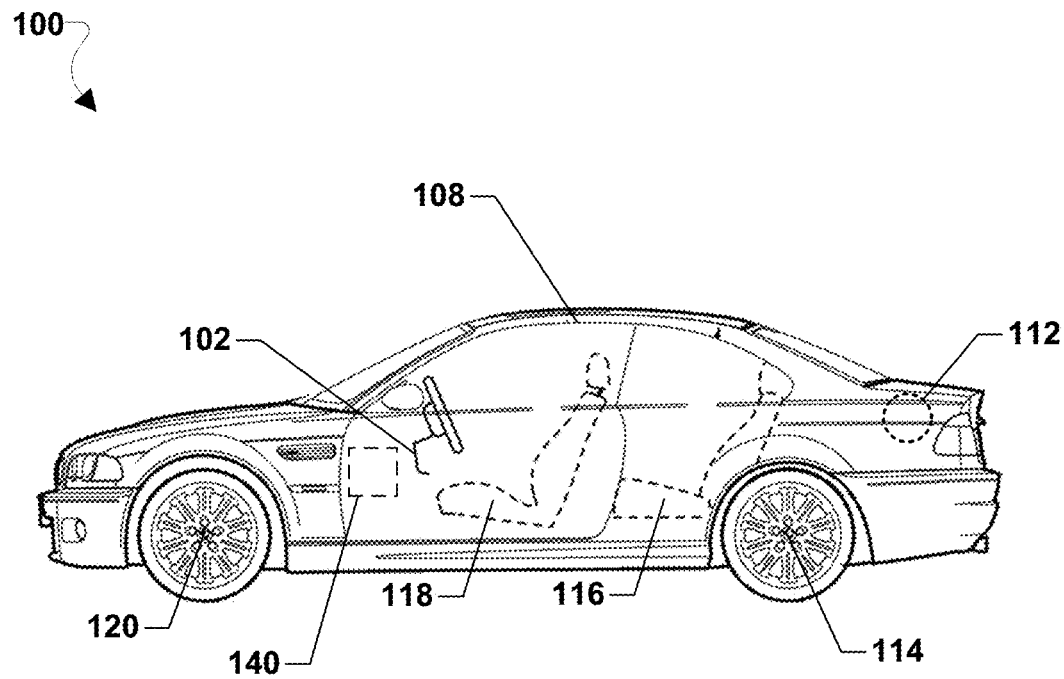
FIGS. 1A and 1B are component block diagrams illustrating a vehicle suitable for implementing various embodiments.

Various aspects will be described in detail with reference to the accompanying drawings. Wherever possible, the same reference numbers will be used throughout the drawings to refer to the same or like parts. References made to particular examples and embodiments are for illustrative purposes and are not intended to limit the scope of the various aspects or the claims.

Vehicle computing systems that execute numerous concurrent neural networks have finite computing resources and must operate within a thermal envelope. Conventional methods of addressing processing limitations in vehicle computing systems include reducing the operating frequency of the processor(s) executing all of the neural networks. While effective in ensuring thermal limits are not exceeded, such methods result in an across-the-board reduction of processing speed and output of every neural network, which in some cases may compromise safety functions. However, not all of the concurrently-executing neural networks are equally important for safe vehicle operations. For example, neural networks performing functions for maneuvering and collision avoidance may be more important for ensuring safe vehicle operations moment-to-moment than a neural network for dynamic re-routing based on traffic density. Thus, the conventional methods of resource and thermal management may unnecessarily degrade the performance of safety-critical neural networks.

Various embodiments include methods and vehicle computing systems implementing the methods when necessary to avoid exceeding processor limits by selectively allocating processing resources to concurrently-executing neural networks based at least in part on relative effects on overall vehicle safety performance, particularly in view of current operating, internal and external conditions. Thus, instead of limiting resources to applications based on an arbitrary ranking or priority, or reducing the operating frequency of processor(s) executing the neural networks, various embodiments take into account how reducing resources to various applications affect overall vehicle safety performance when allocation processing resource to various neural networks within the vehicle computing system.

The surface transportation industry has increasingly looked to leverage the growing capabilities of cellular and wireless communication technologies through the adoption of Intelligent Transportation Systems (ITS) technologies to increase intercommunication and safety for both driver-operated vehicles and autonomous vehicles. The cellular vehicle-to-everything (C-V2X) protocol defined by the 3rd Generation Partnership Project (3GPP) supports ITS technologies and serves as the foundation for vehicles to communicate directly with the communication devices around them.

C-V2X defines two transmission modes that, together, provide a 360° non-line-of-sight awareness and a higher level of predictability for enhanced road safety and autonomous driving. A first transmission mode includes direct C-V2X, which includes vehicle-to-vehicle (V2V), vehicle-to-infrastructure (V2I), and vehicle-to-pedestrian (V2P), and that provides enhanced communication range and reliability in the dedicated ITS 5.9 gigahertz (GHz) spectrum that is independent of a cellular network. A second transmission mode includes vehicle-to-network communications (V2N) in mobile broadband systems and technologies, such as third generation wireless mobile communication technologies (3G) (e.g., global system for mobile communications (GSM) evolution (EDGE) systems, code division multiple access (CDMA) 2000 systems, etc.), fourth generation wireless mobile communication technologies (4G) (e.g., long term evolution (LTE) systems, LTE-Advanced systems, mobile Worldwide Interoperability for Microwave Access (mobile WiMAX) systems, etc.), fifth generation wireless mobile communication technologies (5G) (e.g., 5G New Radio (5G NR) systems, etc.), etc.

The term "system on chip" (SOC) is used herein to refer to a single integrated circuit (IC) chip that contains multiple resources or processors integrated on a single substrate. A single SOC may contain circuitry for digital, analog, mixed-signal, and radio-frequency functions. A single SOC also may include any number of general purpose or specialized processors (digital signal processors, modem processors, video processors, etc.), memory blocks (such as ROM, RAM, Flash, etc.), and resources (such as timers, voltage regulators, oscillators, etc.). SOCs also may include software for controlling the integrated resources and processors, as well as for controlling peripheral devices.

The term "system in a package" (SIP) may be used herein to refer to a single module or package that contains multiple resources, computational units, cores or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high speed communication circuitry and packaged in close proximity, such as on a single motherboard or in a single wireless device. The proximity of the SOCs facilitates high speed communications and the sharing of memory and resources.

As used herein, the terms "component," "system," "unit," "module," and the like include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a communication device and the communication device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

Increasingly, autonomous vehicles (such as autonomous and semi-autonomous cars, drones, mobile robots, and other suitable machines) include multiple sensors that gather information about the environment, and processing systems that process the gathered information to perform vehicle control, route planning, navigation, collision avoidance, and similar vehicle safety and control functions. One example is the Advanced Driver Assistance System (ADAS) deployed in autonomous and semi-autonomous automobiles. To enable rapid analysis of the sensor data and quick decision making, the data from one or more sensors may be processed by a neural network dedicate to the sensor data and/or certain analysis functions. Breaking complex data analysis functions into operations performed by specially trained neural networks enables rapid data analysis, as well as parallel processing of different sensor data. Thus, a vehicle computing system may execute numerous neural networks concurrently during normal operations.

Various embodiments include methods and processing systems configured to implement the methods of allocating processing resources to concurrently-executing neural networks based on the contribution or relative importance of various neural networks to overall vehicle safety and reliable operations. Some embodiments may include allocating vehicle processing resources to concurrently-executing neural network based on a priority or importance of each neural network. In some embodiments a processor (e.g., of a vehicle processing system) may control processing demands of neural networks by adjusting certain of their hyperparameters. Various embodiments enable a substantial reduction in resource allocation to neural networks that are less important (e.g., lower priority) to safe vehicle operations, while executing neural networks that are more important (e.g., higher priority) to safe vehicle operations at a full capacity or high performance.

Various embodiments may include determining a priority of each of a plurality of neural networks executing on a vehicle processing system based on a contribution of each neural network to overall vehicle safety performance, and allocating computing resources to the plurality of neural networks based on the determined priority of each neural network.

In some embodiments, the vehicle processing system may determine a priority of each of a plurality of neural networks executing on a vehicle processing system based on a contribution of each neural network to overall vehicle safety performance in a vehicle operation context. In some embodiments, the vehicle processing system may determine the priority of each of a plurality of neural networks executing on a vehicle processing system based on an indication provided by each neural network of a contribution of that neural network to overall vehicle safety performance. In some embodiments, the vehicle processing system may determine a relative performance of one or more of the plurality of neural networks based on output inferences per second and an output accuracy of each neural network. In some embodiments, each neural network may provide an indication of its dynamic relative importance (in a sort of "voting" scheme). In some embodiments, the dynamic relative importance of each neural network may not be limited to a neural network's output. For example, the processing system may determine a dynamic relative importance of a neural network based on a certain fidelity or precision in the output provided by the neural network.

In some embodiments, the vehicle processing system may assign a priority to a neural network based on the neural network's relative importance to safe vehicle operations in the context of the vehicle's current operating status and/or environment. Depending on whether the vehicle is on a highway, in busy city traffic, driving in a parking lot, etc., different neural networks may be assigned a different relative priority. For example, when a vehicle is driving on the highway, a neural network for a collision avoidance function may be considered more important than a neural network for a dynamic traffic rerouting function.

In some embodiments, the processing system may assign ranks to neural networks performing non-mission-critical tasks or functions, such as neural network performing operations that are relatively less important to safe vehicle operation. For example, neural networks performing relatively unimportant tasks or functions may include neural networks supporting functions such as lane changing frequency, dynamic rerouting frequency, weather detection and/or ambient temperature control, and vehicular night vision. In some embodiments, the processing system may take into account a user preference when assigning a priority to some neural networks. For example, a user preference may indicate a preference for avoiding traffic, or avoiding bad weather.

In some embodiments, the processing system may assign a priority to a neural network semi-dynamically based on a vehicle operation scenario or context. In some embodiments, the processing system may be configured with a lookup table storing relative importance values or indications of various neural networks correlated to certain driving scenarios or contexts. For example, a lookup table may include separate values or indications for each neural network in driving conditions such as highway driving, night driving, residential area driving, parking, and other suitable driving scenarios or contexts. In some embodiments, the processing system may dynamically change a neural network's priority based on a determination of a driving scenario or context. In some embodiments, the processing system may correlate the dynamically changed priority of a neural network with the neural network's relative importance to the determined driving scenario or context.

In some embodiments, the processing system may assign a priority to a neural network dynamically. In some embodiments, the processing system may assign a priority to a neural network based on an output or inferences provided by the neural network. In some embodiments, the priority assigned to a neural network may be determined as a function of objects detected, distance to objects, object classes or types, and/or other inputs to or outputs of the neural network. By assigning a priority to a neural network in this manner, a neural network providing more meaningful or more accurate inference results may be assigned a relatively higher priority.

In some embodiments, the processing system may determine an overall resource budget that may be allocated to the plurality of neural networks. In some embodiments, the resource, or resources, may include power, a thermal power envelope, or another suitable resource.

In some embodiments, the processing system may adjust one or more hyperparameters of one or more of the plurality of neural networks based on the determined priority of the one or more the plurality of neural networks. In some embodiments, the processing system may dynamically adjust the hyperparameters of each neural network based on the dynamic priority of each neural network within the overall resource budget. Nonlimiting examples of hyperparameters that the processing system may adjust include pruning level, parameter quantization, inferences per second, neural network configuration, input resolution, batch size, field of view, and an input image partial mask based on a contextual map. Other examples of hyperparameters that the processing system may adjust are also possible. When the allocated resource decreases, the hyperparameter that has a less impact on the safety performance is chosen to be adjusted. When the allocated resource increases, the hyperparameter that has a more impact on the safety performance is chosen to be adjusted.

In some embodiments, the processing system may determine a relative performance of a neural network as a function of accuracy and output, such as a number of inferences per second, or a number of frames output per second. In some embodiments, a relative performance of a neural network may be represented as:

$$\text{relative performance} = \frac{\text{Accuracy} \times \text{Output } FPS}{\text{Accuracy (best possible)} \times \text{Target } FPS}$$

in which Accuracy represents an accurate successful number of inferences, frames, or other output; Output FPS represents inferences per second of output of the neural network; Accuracy (best possible) represents a target or theoretical maximum accuracy of the neural network; and Target FPS represents a target or theoretical maximum inferences per second of output of the neural network.

In some embodiments, the processing system may determine an effectiveness of a neural network based on whether the neural network performs a function that is relatively important (e.g., relatively high priority) or relatively unimportant (e.g., relatively low priority) to safe vehicle operation. In some embodiments, an effectiveness of a relatively high priority function (HPF) may be represented as:

effectiveness HPF=relative performance$^{4\times(\#functions-rank)}$ in which "#functions" represents a volume of output, such as a number of inferences per second, or a number of frames output per second; and "rank" represents a priority assigned to the neural network.

In some embodiments, an effectiveness of a relatively low priority function (LPF) may be represented as:

$$\text{effectiveness } LPF = \text{relative } performance^{\frac{1}{4\times rank}}.$$

In some embodiments, the processing system may adjust the one or more hyperparameters of each neural network based on a performance-effectiveness curve of one or more of the plurality of neural networks. In some embodiments, the performance-effectiveness curve may include a measure of the effect of adjusting hyperparameters on the performance of each neural network. In some embodiments, each performance-effectiveness curve may be based on an evaluation of the effectiveness versus the relative performance of each neural network. In some embodiments, the processing system may adjust one or more hyperparameters based on the performance-effectiveness curve of a neural network.

In some embodiments, the processing system may determine an overall estimation or evaluation of a performance of each neural network. In some embodiments, such overall evaluation may be referred to as a "Quality of Drive" (QoD) metric, which may be represented as:

QoD=min(effectiveness$_{per\ function}$).

In some embodiments, based on the estimated QoD metric of the vehicle and the estimated consumption of budgeted resources, the processing system may iteratively adjust the hyperparameters of the plurality of neural networks. In some embodiments, QoD may be calculated from a model using inference accuracy and a speed of a neural network as input values.

In some embodiments, the QoD may provide an indication of a quality of drive that is based on factors that a human passenger may perceive and that could have an impact on the passenger's experience riding in the vehicle. Factors that are perceptible to human passenger, such as vertical and lateral accelerations that may be felt by a passenger and outside conditions that are visible to a passenger (e.g., distances to other vehicles), may be determined based on sensor outputs (e.g., accelerometers, lidar, cameras, speedometers, etc.) and analyzed by the processing system against various thresholds and/or user settings. Some vehicle motions or behaviors that are within a safe operating capability of the autonomous vehicle may nevertheless be uncomfortable or distressing to passengers. While, high speed turns, sudden maneuvers, rapid breaking, rapid acceleration, following another vehicle closely (e.g., "caravanning") may be perfectly safe given the capabilities of the autonomous vehicle, such motions and exterior conditions may be perceived by a human passenger as dangerous or uncomfortable, and/or may induce motion sickness, which may decrease the quality of drive experienced by the passenger. For example, high speed turns and sudden maneuvers may frighten a human passenger and/or induce motion sickness. As another example, following another vehicle very closely or sudden breaking may make a passenger feel unsafe. Accordingly, in some embodiments, the processing system may be configured with one or more thresholds related to one or more vehicle motions or behaviors or factors perceptible to human passengers, with such thresholds set so as to improve the passenger experience. In such embodiments, the processing system may determine that a QoD is inappropriate, undesirable, or unacceptable to a human passenger in response to determining that one or more vehicle motions, behaviors or other factors perceptible to a passenger exceeds a threshold established or set so as to improve the experience of a passenger. Thus, in some embodiments, the processing system may determine the overall vehicle safety performance at least in part based on (or with consideration given to) determining whether one or more passenger-perceptible factors exceeds a threshold established or set with the objective of improving the experience of a passenger.

In some embodiments, the processing system may determine a performance of one or more of the plurality of neural networks using the allocated computing resources, and may reallocate computing resources to one or more of the plurality of neural networks based on the determined performance of one or more of the plurality of neural networks. In some embodiments, reallocating computing resources to one or more of the plurality of neural networks based on the determined performance of one or more of the plurality of neural networks may include readjusting one or more hyperparameters of one or more of the plurality of neural networks based on the determined performance of one or more (e.g., each) of the plurality of neural networks.

In some embodiments, the processing system may be configured to attempt to maximize a Quality of Drive (QoD) metric. In some embodiments, the processing system may determine the QoD metric relative to a thermal power envelope of the processing system. In some embodiments, based on the processing system's thermal power envelope and the relative importance of each neural network (e.g., the rank or priority assigned to each neural network), the processing system may determine a current QoD metric. The processing system may then determine an estimated power consumption of the processing system.

In response to determining that the current estimated processing system power consumption is greater than the thermal power envelope, the processing system may adjust one or more hyperparameters of one or more neural networks to decrease the power consumption by the processing system. In response to determining that the current estimated processing system power consumption is less than the thermal power envelope, the processing system may adjust one or more hyperparameters of one or more neural networks to permit increased power consumption to improve performance. In some embodiments, adjusting one or more hyperparameters of one or more neural networks to permit increased power consumption may increase the QoD metric. In some embodiments, when operating conditions permit, the processing system may increase processing resources allocated to one or more of the neural networks by readjusting hyperparameters of the neural networks, such as setting hyperparameters back to default or normal settings.

In some embodiments, the processor may determine whether available computing resources have increased, decreased, or remained the same. In response to determining that the available computing resources have increased, the processor may adjust one or more neural network hyperparameters that have a relatively greater effect on overall vehicle safety performance. In response to determining that the available computing resources have decreased, the processor may adjust one or more neural network hyperparameters that have relatively less effect on overall vehicle safety performance.

Various embodiments, improve the functionality of vehicle systems by providing at least some computing resources to neural networks that are important to the safe operation of the vehicle even when overall computing resources are reduced. Various embodiments improve the safety of vehicles by dynamically allocating finite computing resources to the plurality of vehicle neural networks according to the importance of each vehicle neural network to safe vehicle operations in a particular vehicle operating situation or context.

Figure 1B:
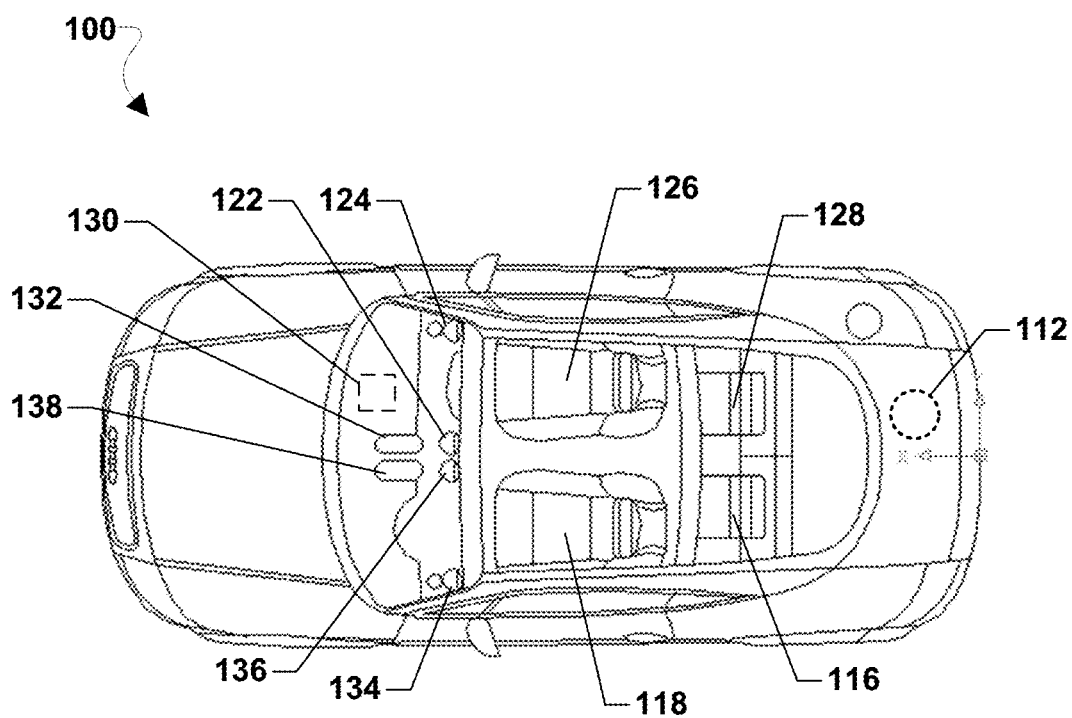

Various embodiments may be implemented within a variety of vehicles, an example vehicle 100 of which is illustrated in FIGS. 1A and 1B. With reference to FIGS. 1A and 1B, a vehicle 100 may include a control unit 140 and a plurality of sensors 102-138, including satellite geopositioning system receivers 108, occupancy sensors 112, 116, 118, 126, 128, tire pressure sensors 114, 120, cameras 122, 136, microphones 124, 134, impact sensors 130, radar 132, and lidar 138. The plurality of sensors 102-138, disposed in or on the vehicle, may be used for various purposes, such as autonomous and semi-autonomous navigation and control, crash avoidance, position determination, etc., as well to provide sensor data regarding objects and people in or on the vehicle 100. The sensors 102-138 may include one or more of a wide variety of sensors capable of detecting a variety of information useful for navigation and collision avoidance. Each of the sensors 102-138 may be in wired or wireless communication with a control unit 140, as well as with each other. In particular, the sensors may include one or more cameras 122, 136 or other optical sensors or photo optic sensors. The sensors may further include other types of object detection and ranging sensors, such as radar 132, lidar 138, IR sensors, and ultrasonic sensors. The sensors may further include tire pressure sensors 114, 120, humidity sensors, temperature sensors, satellite geopositioning sensors 108, accelerometers, vibration sensors, gyroscopes, gravimeters, impact sensors 130, force meters, stress meters, strain sensors, fluid sensors, chemical sensors, gas content analyzers, pH sensors, radiation sensors, Geiger counters, neutron detectors, biological material sensors, microphones 124, 134, occupancy sensors 112, 116, 118, 126, 128, proximity sensors, and other sensors.

The vehicle control unit 140 may be configured with processor-executable instructions to perform various embodiments using information received from various sensors, particularly the cameras 122, 136. In some embodiments, the control unit 140 may supplement the processing of camera images using distance and relative position (e.g., relative bearing angle) that may be obtained from radar 132 and/or lidar 138 sensors. The control unit 140 may further be configured to control steering, breaking and speed of the vehicle 100 when operating in an autonomous or semi-autonomous mode using information regarding other vehicles determined using various embodiments.

Figure 1C:
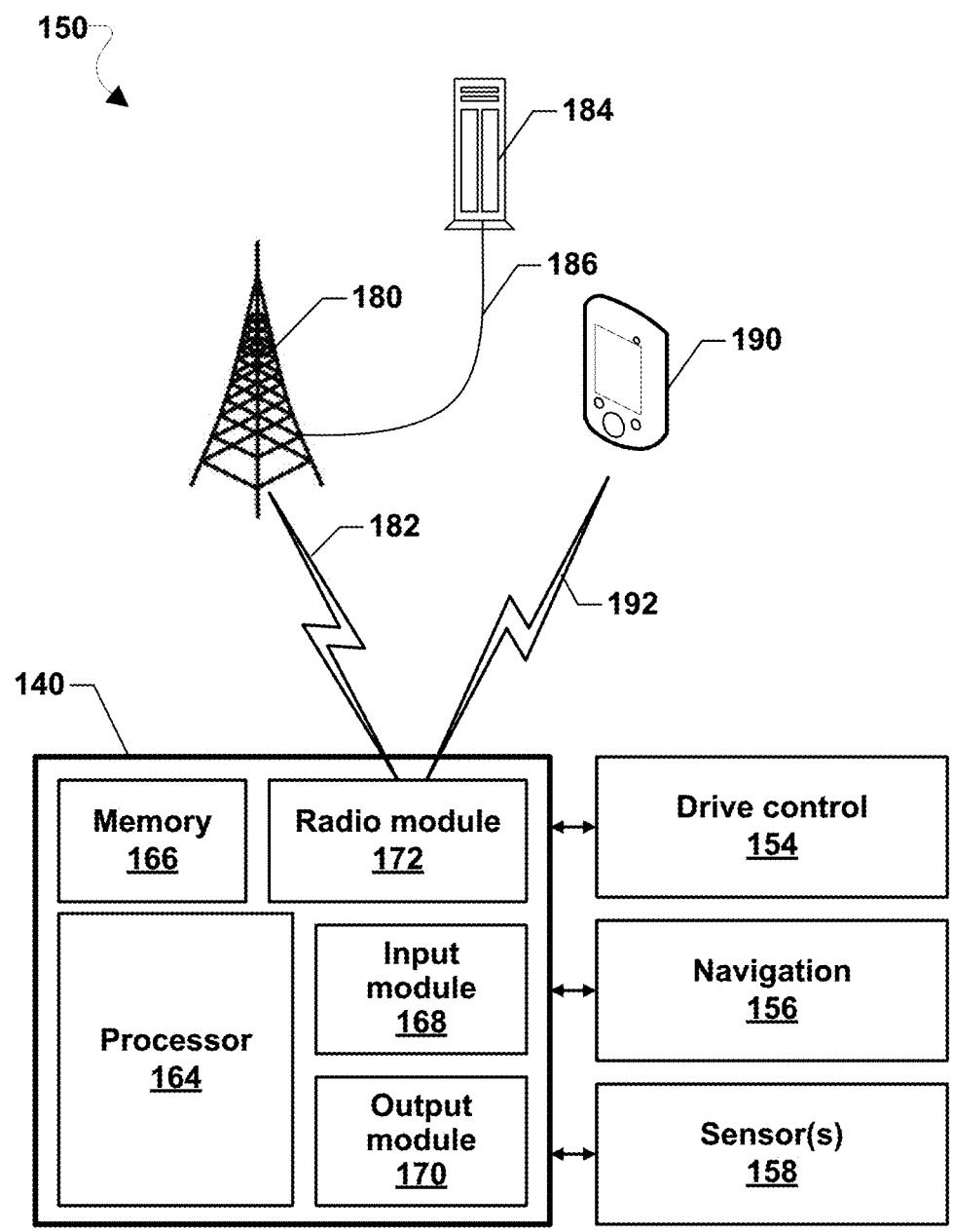
FIG. 1C is a component block diagram illustrating components of a vehicle suitable for implementing various embodiments.

FIG. 1C is a component block diagram illustrating a system 150 of components and support systems suitable for implementing various embodiments. With reference to FIGS. 1A, 1B, and 1C, a vehicle 100 may include a control unit 140, which may include various circuits and devices used to control the operation of the vehicle 100. In the example illustrated in FIG. 1C, the control unit 140 includes a processor 164, memory 166, an input module 168, an output module 170 and a radio module 172. The control unit 140 may be coupled to and configured to control drive control components 154, navigation components 156, and one or more sensors 158 of the vehicle 100.

The control unit 140 may include a processor 164 that may be configured with processor-executable instructions to control maneuvering, navigation, and/or other operations of the vehicle 100, including operations of various embodiments. The processor 164 may be coupled to the memory 166. The control unit 162 may include the input module 168, the output module 170, and the radio module 172.

The radio module 172 may be configured for wireless communication. The radio module 172 may exchange signals 182 (e.g., command signals for controlling maneuvering, signals from navigation facilities, etc.) with a network transceiver 180, and may provide the signals 182 to the processor 164 and/or the navigation unit 156. In some embodiments, the radio module 172 may enable the vehicle 100 to communicate with a wireless communication device 190 through a wireless communication link 192. The wireless communication link 192 may be a bidirectional or unidirectional communication link, and may use one or more communication protocols.

The input module 168 may receive sensor data from one or more vehicle sensors 158 as well as electronic signals from other components, including the drive control components 154 and the navigation components 156. The output module 170 may be used to communicate with or activate various components of the vehicle 100, including the drive control components 154, the navigation components 156, and the sensor(s) 158.

The control unit 140 may be coupled to the drive control components 154 to control physical elements of the vehicle 100 related to maneuvering and navigation of the vehicle, such as the engine, motors, throttles, steering elements, flight control elements, braking or deceleration elements, and the like. The drive control components 154 may also include components that control other devices of the vehicle, including environmental controls (e.g., air conditioning and heating), external and/or interior lighting, interior and/or exterior informational displays (which may include a display screen or other devices to display information), safety devices (e.g., haptic devices, audible alarms, etc.), and other similar devices.

The control unit 140 may be coupled to the navigation components 156, and may receive data from the navigation components 156 and be configured to use such data to determine the present position and orientation of the vehicle 100, as well as an appropriate course toward a destination. In various embodiments, the navigation components 156 may include or be coupled to a global navigation satellite system (GNSS) receiver system (e.g., one or more Global Positioning System (GPS) receivers) enabling the vehicle 100 to determine its current position using GNSS signals. Alternatively, or in addition, the navigation components 156 may include radio navigation receivers for receiving navigation beacons or other signals from radio nodes, such as Wi-Fi access points, cellular network sites, radio station, remote computing devices, other vehicles, etc. Through control of the drive control elements 154, the processor 164 may control the vehicle 100 to navigate and maneuver. The processor 164 and/or the navigation components 156 may be configured to communicate with a server 184 on a network 186 (e.g., the Internet) using a wireless connection 182 with a cellular data network 180 to receive commands to control maneuvering, receive data useful in navigation, provide real-time position reports, and assess other data.

The control unit 162 may be coupled to one or more sensors 158. The sensor(s) 158 may include the sensors 102-138 as described, and may the configured to provide a variety of data to the processor 164.

While the control unit 140 is described as including separate components, in some embodiments some or all of the components (e.g., the processor 164, the memory 166, the input module 168, the output module 170, and the radio module 172) may be integrated in a single device or module, such as a system-on-chip (SOC) processing device. Such an SOC processing device may be configured for use in vehicles and be configured, such as with processor-executable instructions executing in the processor 164, to perform operations of various embodiments when installed into a vehicle.

Figure 2A:
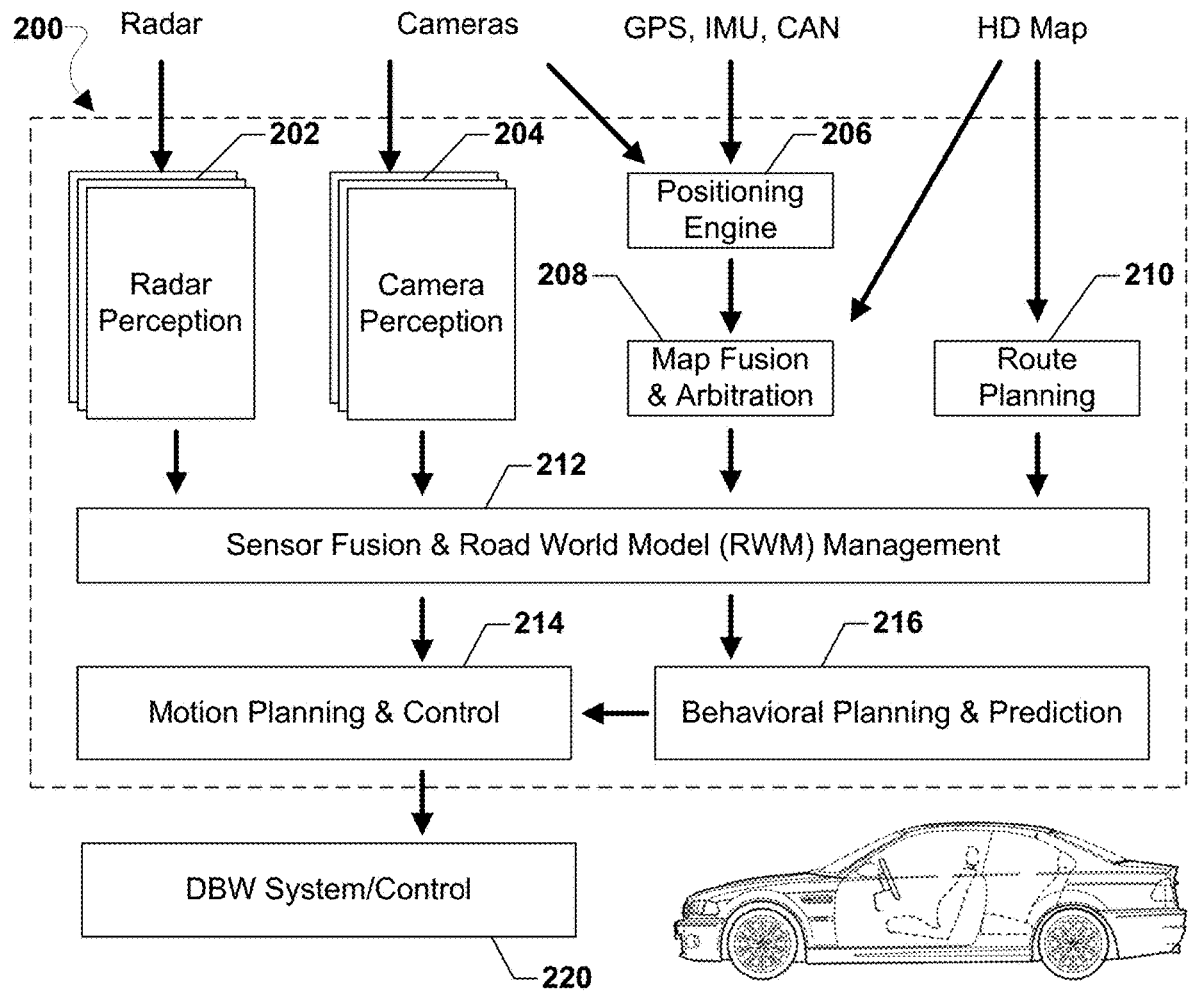
FIG. 2A is a component block diagram illustrating components of an example vehicle management system according to various embodiments.

FIG. 2A illustrates an example of vehicle applications, subsystems, computational elements, or units within a vehicle management system 200, which may be utilized within a vehicle 100. With reference to FIGS. 1A-2A, in some embodiments, the various vehicle applications, computational elements, or units within vehicle management system 200 may be implemented within a system of interconnected computing devices (i.e., subsystems), that communicate data and commands to each other (e.g., indicated by the arrows in FIG. 2A). In other embodiments, the vehicle management system 200 may be implemented as a plurality of vehicle applications executing within a single computing device, such as separate threads, processes, algorithms or computational elements. However, the use of the term vehicle applications in describing various embodiments are not intended to imply or require that the corresponding functionality is implemented within a single autonomous (or semi-autonomous) vehicle management system computing device, although that is a potential implementation embodiment. Rather the use of the term vehicle applications is intended to encompass subsystems with independent processors, computational elements (e.g., threads, algorithms, subroutines, etc.) running in one or more computing devices, and combinations of subsystems and computational elements.

In various embodiments, the vehicle applications executing in a vehicle management system stack 200 may include (but is not limited to) a radar perception application 202, a camera perception application 204, a positioning engine application 206, a map fusion and arbitration application 208, a route planning application 210, sensor fusion and road world model (RWM) management application 212, motion planning and control application 214, and behavioral planning and prediction application 216. The vehicle applications 202-216 are merely examples of some vehicle applications in one example configuration of the vehicle management system stack 200. In other configurations consistent with various embodiments, other vehicle applications may be included, such as additional vehicle applications for other perception sensors (e.g., LIDAR perception layer, etc.), additional vehicle applications for planning and/or control, additional vehicle applications for modeling, etc., and/or certain of the vehicle applications 202-216 may be excluded from the vehicle management system stack 200. Each of the vehicle applications 202-216 may exchange data, computational results and commands as illustrated by the arrows in FIG. 2A.

The vehicle management system stack 200 may receive and process data from sensors (e.g., radar, lidar, cameras, inertial measurement units (IMU) etc.), navigation systems (e.g., GPS receivers, IMUs, etc.), vehicle networks (e.g., Controller Area Network (CAN) bus), and databases in memory (e.g., digital map data). The vehicle management system stack 200 may output vehicle control commands or signals to the drive by wire (DBW) system/control unit 220, which is a system, subsystem or computing device that interfaces directly with vehicle steering, throttle and brake controls. The configuration of the vehicle management system stack 200 and DBW system/control unit 220 illustrated in FIG. 2A is merely an example configuration and other configurations of a vehicle management system and other vehicle components may be used in the various embodiments. As an example, the configuration of the vehicle management system stack 200 and DBW system/control unit 220 illustrated in FIG. 2A may be used in a vehicle configured for autonomous or semi-autonomous operation while a different configuration may be used in a non-autonomous vehicle.

The radar perception vehicle application 202 may receive data from one or more detection and ranging sensors, such as radar (e.g., 132) and/or lidar (e.g., 138), and process the data to recognize and determine locations of other vehicles and objects within a vicinity of the vehicle 100. The radar perception vehicle application 202 may include use of neural network processing and artificial intelligence methods to recognize objects and vehicles, and pass such information on to the sensor fusion and RWM management vehicle application 212.

The camera perception vehicle application 204 may receive data from one or more cameras, such as cameras (e.g., 122, 136), and process the data to recognize and determine locations of other vehicles and objects within a vicinity of the vehicle 100. The camera perception vehicle application 204 may include use of neural network processing and artificial intelligence methods to recognize objects and vehicles, and pass such information on to the sensor fusion and RWM management vehicle application 212.

The positioning engine vehicle application 206 may receive data from various sensors and process the data to determine a position of the vehicle 100. The various sensors may include, but is not limited to, GPS sensor, an IMU, and/or other sensors connected via a CAN bus. The positioning engine vehicle application 206 may also utilize inputs from one or more cameras, such as cameras (e.g., 122, 136) and/or any other available sensor, such as radars, LIDARs, etc.

The map fusion and arbitration vehicle application 208 may access data within a high-definition (HD) map database and receive output received from the positioning engine vehicle application 206 and process the data to further determine the position of the vehicle 100 within the map, such as location within a lane of traffic, position within a street map, etc. The HD map database may be stored in a memory (e.g., memory 166). For example, the map fusion and arbitration vehicle application 208 may convert latitude and longitude information from GPS into locations within a surface map of roads contained in the HD map database. GPS position fixes include errors, so the map fusion and arbitration vehicle application 208 may function to determine a best guess location of the vehicle 100 within a roadway based upon an arbitration between the GPS coordinates and the HD map data. For example, while GPS coordinates may place the vehicle 100 near the middle of a two-lane road in the HD map, the map fusion and arbitration vehicle application 208 may determine from the direction of travel that the vehicle 100 is most likely aligned with the travel lane consistent with the direction of travel. The map fusion and arbitration vehicle application 208 may pass map-based location information to the sensor fusion and RWM management vehicle application 212.

The route planning vehicle application 210 may utilize the HD map, as well as inputs from an operator or dispatcher to plan a route to be followed by the vehicle 100 to a particular destination. The route planning vehicle application 210 may pass map-based location information to the sensor fusion and RWM management vehicle application 212. However, the use of a prior map by other vehicle applications, such as the sensor fusion and RWM management vehicle application 212, etc., is not required. For example, other stacks may operate and/or control the vehicle based on perceptual data alone without a provided map, constructing lanes, boundaries, and the notion of a local map as perceptual data is received.

The sensor fusion and RWM management vehicle application 212 may receive data and outputs produced by one or more of the radar perception vehicle application 202, camera perception vehicle application 204, map fusion and arbitration vehicle application 208, and route planning vehicle application 210, and use some or all of such inputs to estimate or refine the location and state of the vehicle 100 in relation to the road, other vehicles on the road, and other objects within a vicinity of the vehicle 100. For example, the sensor fusion and RWM management vehicle application 212 may combine imagery data from the camera perception vehicle application 204 with arbitrated map location information from the map fusion and arbitration vehicle application 208 to refine the determined position of the vehicle within a lane of traffic. As another example, the sensor fusion and RWM management vehicle application 212 may combine object recognition and imagery data from the camera perception vehicle application 204 with object detection and ranging data from the radar perception vehicle application 202 to determine and refine the relative position of other vehicles and objects in the vicinity of the vehicle. As another example, the sensor fusion and RWM management vehicle application 212 may receive information from vehicle-to-vehicle (V2V) communications (such as via the CAN bus) regarding other vehicle positions and directions of travel, and combine that information with information from the radar perception vehicle application 202 and the camera perception vehicle application 204 to refine the locations and motions of other vehicles. The sensor fusion and RWM management vehicle application 212 may output refined location and state information of the vehicle 100, as well as refined location and state information of other vehicles and objects in the vicinity of the vehicle, to the motion planning and control vehicle application 214 and/or the behavior planning and prediction vehicle application 216.

As a further example, the sensor fusion and RWM management vehicle application 212 may use dynamic traffic control instructions directing the vehicle 100 to change speed, lane, direction of travel, or other navigational element(s), and combine that information with other received information to determine refined location and state information. The sensor fusion and RWM management vehicle application 212 may output the refined location and state information of the vehicle 100, as well as refined location and state information of other vehicles and objects in the vicinity of the vehicle 100, to the motion planning and control vehicle application 214, the behavior planning and prediction vehicle application 216 and/or devices remote from the vehicle 100, such as a data server, other vehicles, etc., via wireless communications, such as through C-V2X connections, other wireless connections, etc.

As a still further example, the sensor fusion and RWM management vehicle application 212 may monitor perception data from various sensors, such as perception data from a radar perception vehicle application 202, camera perception vehicle application 204, other perception vehicle application, etc., and/or data from one or more sensors themselves to analyze conditions in the vehicle sensor data. The sensor fusion and RWM management vehicle application 212 may be configured to detect conditions in the sensor data, such as sensor measurements being at, above, or below a threshold, certain types of sensor measurements occurring, etc., and may output the sensor data as part of the refined location and state information of the vehicle 100 provided to the behavior planning and prediction vehicle application 216 and/or devices remote from the vehicle 100, such as a data server, other vehicles, etc., via wireless communications, such as through C-V2X connections, other wireless connections, etc.

The refined location and state information may include vehicle descriptors associated with the vehicle 100 and the vehicle owner and/or operator, such as: vehicle specifications (e.g., size, weight, color, on board sensor types, etc.); vehicle position, speed, acceleration, direction of travel, attitude, orientation, destination, fuel/power level(s), and other state information; vehicle emergency status (e.g., is the vehicle an emergency vehicle or private individual in an emergency); vehicle restrictions (e.g., heavy/wide load, turning restrictions, high occupancy vehicle (HOV) authorization, etc.); capabilities (e.g., all-wheel drive, four-wheel drive, snow tires, chains, connection types supported, on board sensor operating statuses, on board sensor resolution levels, etc.) of the vehicle; equipment problems (e.g., low tire pressure, weak breaks, sensor outages, etc.); owner/operator travel preferences (e.g., preferred lane, roads, routes, and/or destinations, preference to avoid tolls or highways, preference for the fastest route, etc.); permissions to provide sensor data to a data agency server (e.g., 184); and/or owner/operator identification information.

The behavioral planning and prediction vehicle application 216 of the autonomous vehicle system stack vehicle application 200 may use the refined location and state information of the vehicle 100 and location and state information of other vehicles and objects output from the sensor fusion and RWM management vehicle application 212 to predict future behaviors of other vehicles and/or objects. For example, the behavioral planning and prediction vehicle application 216 may use such information to predict future relative positions of other vehicles in the vicinity of the vehicle based on own vehicle position and velocity and other vehicle positions and velocity. Such predictions may take into account information from the HD map and route planning to anticipate changes in relative vehicle positions as host and other vehicles follow the roadway. The behavioral planning and prediction vehicle application 216 may output other vehicle and object behavior and location predictions to the motion planning and control vehicle application 214.

Additionally, the behavior planning and prediction vehicle application 216 may use object behavior in combination with location predictions to plan and generate control signals for controlling the motion of the vehicle 100. For example, based on route planning information, refined location in the roadway information, and relative locations and motions of other vehicles, the behavior planning and prediction vehicle application 216 may determine that the vehicle 100 needs to change lanes and accelerate, such as to maintain or achieve minimum spacing from other vehicles, and/or prepare for a turn or exit. As a result, the behavior planning and prediction vehicle application 216 may calculate or otherwise determine a steering angle for the wheels and a change to the throttle setting to be commanded to the motion planning and control vehicle application 214 and DBW system/control vehicle applications 220 along with such various parameters necessary to effectuate such a lane change and acceleration. One such parameter may be a computed steering wheel command angle.

The motion planning and control vehicle application 214 may receive data and information outputs from the sensor fusion and RWM management vehicle application 212 and other vehicle and object behavior as well as location predictions from the behavior planning and prediction vehicle application 216, and use this information to plan and generate control signals for controlling the motion of the vehicle 100 and to verify that such control signals meet safety requirements for the vehicle 100. For example, based on route planning information, refined location in the roadway information, and relative locations and motions of other vehicles, the motion planning and control vehicle application 214 may verify and pass various control commands or instructions to the DBW system/control vehicle applications 220.

The DBW system/control unit 220 may receive the commands or instructions from the motion planning and control vehicle application 214 and translate such information into mechanical control signals for controlling wheel angle, brake and throttle of the vehicle 100. For example, DBW system/control vehicle applications 220 may respond to the computed steering wheel command angle by sending corresponding control signals to the steering wheel controller.

In various embodiments, the vehicle management system stack 200 may include functionality that performs safety checks or oversight of various commands, planning or other decisions of various vehicle applications that could impact vehicle and occupant safety. Such safety check or oversight functionality may be implemented within a dedicated vehicle application or distributed among various vehicle applications and included as part of the functionality. In some embodiments, a variety of safety parameters may be stored in memory and the safety checks or oversight functionality may compare a determined value (e.g., relative spacing to a nearby vehicle, distance from the roadway centerline, etc.) to corresponding safety parameter(s), and issue a warning or command if the safety parameter is or will be violated. For example, a safety or oversight function in the behavior planning and prediction vehicle application 216 (or in a separate vehicle application) may determine the current or future separate distance between another vehicle (as refined by the sensor fusion and RWM management vehicle application 212) and the vehicle 100 (e.g., based on the world model refined by the sensor fusion and RWM management vehicle application 212), compare that separation distance to a safe separation distance parameter stored in memory, and issue instructions to the motion planning and control vehicle application 214 to speed up, slow down or turn if the current or predicted separation distance violates the safe separation distance parameter. As another example, safety or oversight functionality in the motion planning and control vehicle application 214 (or a separate vehicle application) may compare a determined or commanded steering wheel command angle to a safe wheel angle limit or parameter, and issue an override command and/or alarm in response to the commanded angle exceeding the safe wheel angle limit.

Some safety parameters stored in memory may be static (i.e., unchanging over time), such as maximum vehicle speed. Other safety parameters stored in memory may be dynamic in that the parameters are determined or updated continuously or periodically based on vehicle state information and/or environmental conditions. Non-limiting examples of safety parameters include maximum safe speed, maximum brake pressure, maximum acceleration, and the safe wheel angle limit, all of which may be a function of roadway and weather conditions.

Figure 2B:
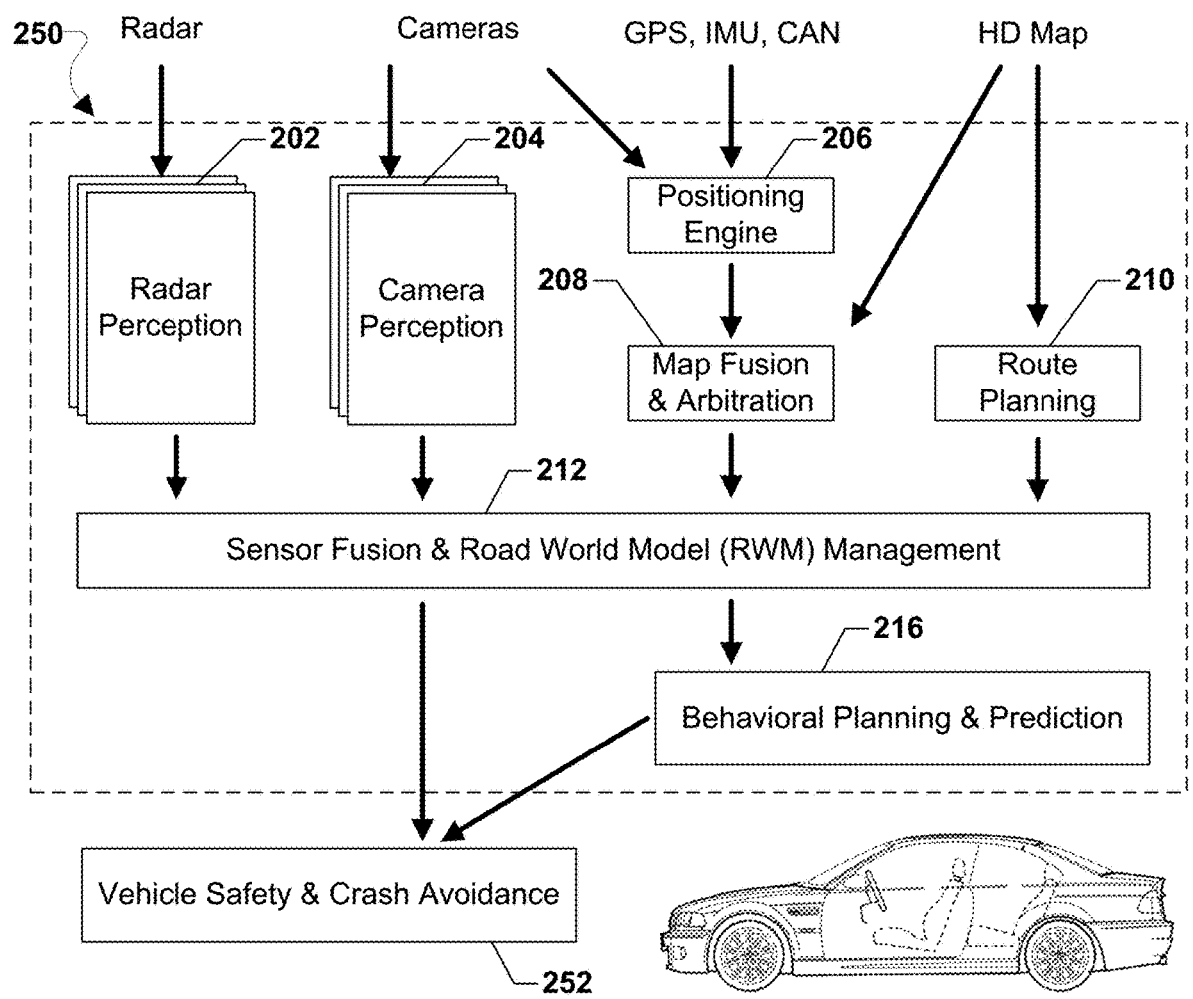
FIG. 2B is a component block diagram illustrating components of another example vehicle management system according to various embodiments.

FIG. 2B illustrates an example of vehicle applications, subsystems, computational elements, or units within a vehicle management system 250, which may be utilized within a vehicle 100. With reference to FIGS. 1A-2B, in some embodiments, the vehicle applications 202, 204, 206, 208, 210, 212, and 216 of the vehicle management system stack 200 may be similar to those described with reference to FIG. 2A and the vehicle management system stack 250 may operate similar to the vehicle management system stack 200, except that the vehicle management system stack 250 may pass various data or instructions to a vehicle safety and crash avoidance system 252 rather than the DBW system/control vehicle application 220. For example, the configuration of the vehicle management system stack 250 and the vehicle safety and crash avoidance system vehicle application 252 illustrated in FIG. 2B may be used in a non-autonomous vehicle.

In various embodiments, the behavioral planning and prediction vehicle application 216 and/or sensor fusion and RWM management vehicle application 212 may output data to the vehicle safety and crash avoidance system vehicle application 252. For example, the sensor fusion and RWM management vehicle application 212 may output sensor data as part of refined location and state information of the vehicle 100 provided to the vehicle safety and crash avoidance system vehicle application 252. The vehicle safety and crash avoidance system vehicle application 252 may use the refined location and state information of the vehicle 100 to make safety determinations relative to the vehicle 100 and/or occupants of the vehicle 100. As another example, the behavioral planning and prediction vehicle application 216 may output behavior models and/or predictions related to the motion of other vehicles to the vehicle safety and crash avoidance system 252. The vehicle safety and crash avoidance system vehicle application 252 may use the behavior models and/or predictions related to the motion of other vehicles to make safety determinations relative to the vehicle 100 and/or occupants of the vehicle 100.

In various embodiments, the vehicle safety and crash avoidance system vehicle application 252 may include functionality that performs safety checks or oversight of various commands, planning, or other decisions of various vehicle applications, as well as human driver actions, that could impact vehicle and occupant safety. In some embodiments, a variety of safety parameters may be stored in memory and the vehicle safety and crash avoidance system vehicle application 252 may compare a determined value (e.g., relative spacing to a nearby vehicle, distance from the roadway centerline, etc.) to corresponding safety parameter(s), and issue a warning or command if the safety parameter is or will be violated. For example, a vehicle safety and crash avoidance system vehicle application 252 may determine the current or future separate distance between another vehicle (as refined by the sensor fusion and RWM management vehicle application 212) and the vehicle (e.g., based on the world model refined by the sensor fusion and RWM management vehicle application 212), compare that separation distance to a safe separation distance parameter stored in memory, and issue instructions to a driver to speed up, slow down or turn if the current or predicted separation distance violates the safe separation distance parameter. As another example, a vehicle safety and crash avoidance system vehicle application 252 may compare a human driver's change in steering wheel angle to a safe wheel angle limit or parameter, and issue an override command and/or alarm in response to the steering wheel angle exceeding the safe wheel angle limit.

Figure 3:
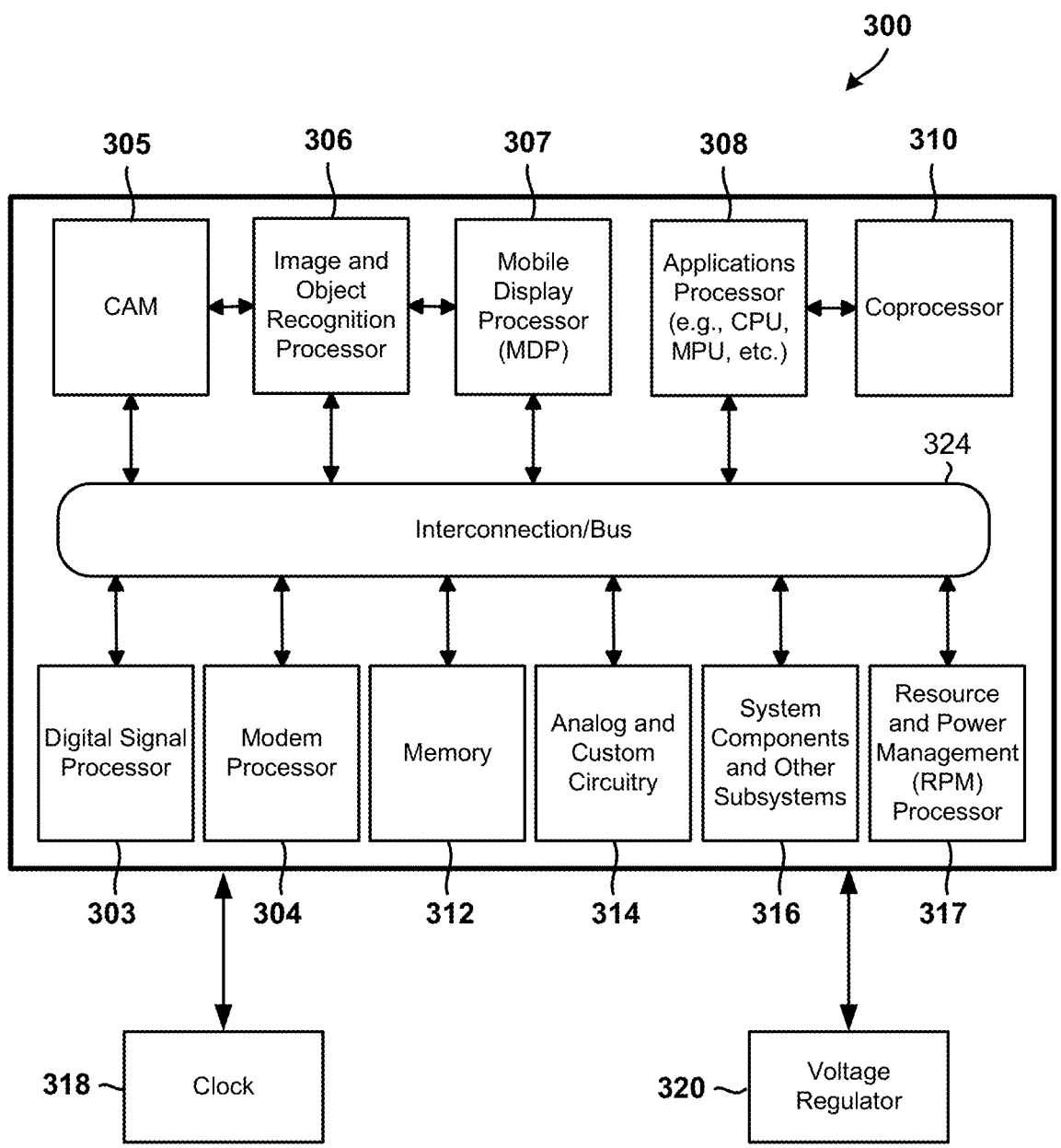
FIG. 3 is a block diagram illustrating components of an example system on chip for use in a vehicle according to various embodiments.

FIG. 3 illustrates an example system-on-chip (SOC) architecture of a processing device SOC 300 suitable for implementing various embodiments in vehicles. With reference to FIGS. 1A-3, the processing device SOC 300 may include a variety of processing resources, including a number of heterogeneous processors, such as a digital signal processor (DSP) 303, a modem processor 304, an image and object recognition processor 306, a mobile display processor 307, an applications processor 308, and a resource and power management (RPM) processor 317. The processing device SOC 300 may also include one or more coprocessors 310 (e.g., vector co-processor) connected to one or more of the heterogeneous processors 303, 304, 306, 307, 308, 317. Each of the processors may include one or more cores, and an independent/internal clock. Each processor/core may perform operations independent of the other processors/cores. For example, the processing device SOC 300 may include a processor that executes a first type of operating system (e.g., FreeBSD, LINUX, OS X, etc.) and a processor that executes a second type of operating system (e.g., Microsoft Windows). In some embodiments, the applications processor 308 may be the SOC's 300 main processor, central processing unit (CPU), microprocessor unit (MPU), arithmetic logic unit (ALU), etc. The graphics processor 306 may be graphics processing unit (GPU).

The processing device SOC 300 may include analog circuitry and custom circuitry 314 for managing sensor data, analog-to-digital conversions, wireless data transmissions, and for performing other specialized operations, such as processing encoded audio and video signals for rendering in a web browser. The processing device SOC 300 may further include system components and other subsystems 316, such as voltage regulators, oscillators, phase-locked loops, peripheral bridges, data controllers, memory controllers, system controllers, access ports, timers, and other similar components used to support the processors and software clients (e.g., a web browser) running on a computing device.

The processing device SOC 300 also include specialized circuitry for camera actuation and management (CAM) 305 that includes, provides, controls and/or manages the operations of one or more cameras 122, 136 (e.g., a primary camera, webcam, 3D camera, etc.), the video display data from camera firmware, image processing, video preprocessing, video front-end (VFE), in-line JPEG, high definition video codec, etc. The CAM 305 may be an independent processing unit and/or include an independent or internal clock.

In some embodiments, the image and object recognition processor 306 may be configured with processor-executable instructions and/or specialized hardware configured to perform image processing and object recognition analyses involved in various embodiments. For example, the image and object recognition processor 306 may be configured to perform the operations of processing images received from cameras (e.g., 122, 136) via the CAM 305 to recognize and/or identify other vehicles, and otherwise perform functions of the camera perception vehicle application 204 as described. In some embodiments, the processor 306 may be configured to process radar or lidar data and perform functions of the radar perception vehicle application 202 as described.

The system components and other subsystems 316, analog and custom circuitry 314, and/or CAM 305 may include circuitry to interface with peripheral devices, such as cameras 122, 136, radar 132, lidar 138, electronic displays, wireless communication devices, external memory chips, etc. The processors 303, 304, 306, 307, 308 may be interconnected to one or more memory elements 312, system components and other subsystems 316, analog and custom circuitry 314, CAM 305, and RPM processor 317 via an interconnection/bus module 324, which may include an array of reconfigurable logic gates and/or implement a bus architecture (e.g., CoreConnect, AMBA, etc.). Communications may be provided by advanced interconnects, such as high-performance networks-on chip (NoCs).

The processing device SOC 300 may further include an input/output module (not illustrated) for communicating with resources external to the SOC, such as a clock 318 and a voltage regulator 320. Resources external to the SOC (e.g., clock 318, voltage regulator 320) may be shared by two or more of the internal SOC processors/cores (e.g., a DSP 303, a modem processor 304, a graphics processor 306, an applications processor 308, etc.).

In some embodiments, the processing device SOC 300 may be included in a control unit (e.g., 140) for use in a vehicle (e.g., 100). The control unit may include communication links for communication with a telephone network (e.g., 180), the Internet, and/or a network server (e.g., 184) as described.

The processing device SOC 300 may also include additional hardware and/or software components that are suitable for collecting sensor data from sensors, including motion sensors (e.g., accelerometers and gyroscopes of an IMU), user interface elements (e.g., input buttons, touch screen display, etc.), microphone arrays, sensors for monitoring physical conditions (e.g., location, direction, motion, orientation, vibration, pressure, etc.), cameras, compasses, GPS receivers, communications circuitry (e.g., Bluetooth®, WLAN, WiFi, etc.), and other well-known components of modern electronic devices.

Some or all of the elements within the SOC 300 described with reference to FIG. 3 may be computing resources that are allocated to vehicle applications according to various embodiments. However, allocable computing resources also include voltages (or currents) supplied to the SOC 300 and/or particular components within therein, such as by the voltage regulator 320, and/or operating frequency allocated to the SOC 300 and/or particular components within therein, such as by the clock 318. For example, the purpose of allocating computing resources may involve reducing (or increasing): the rate of processing operations (e.g., number of operations performed per second); memory usage; processor operating frequency; processor current; access to co-processors or other components, etc., which are generally and collectively referred to herein as computing resources. Further, reductions in allocated computing resources (e.g., processing operations, memory usage, processor frequency, processor current, etc.) may be achieved by various vehicle applications by adjusting one or more parameters or alternatives affecting application performance or operations as described herein with reference to FIG. 5A. For example, allocation of computing resources to each vehicle application may be accomplished by adjusting one or more of inferences per second, input image resolution, processing accuracy, quality of output, algorithms used by the application, or functionality of the application.

Figure 4:
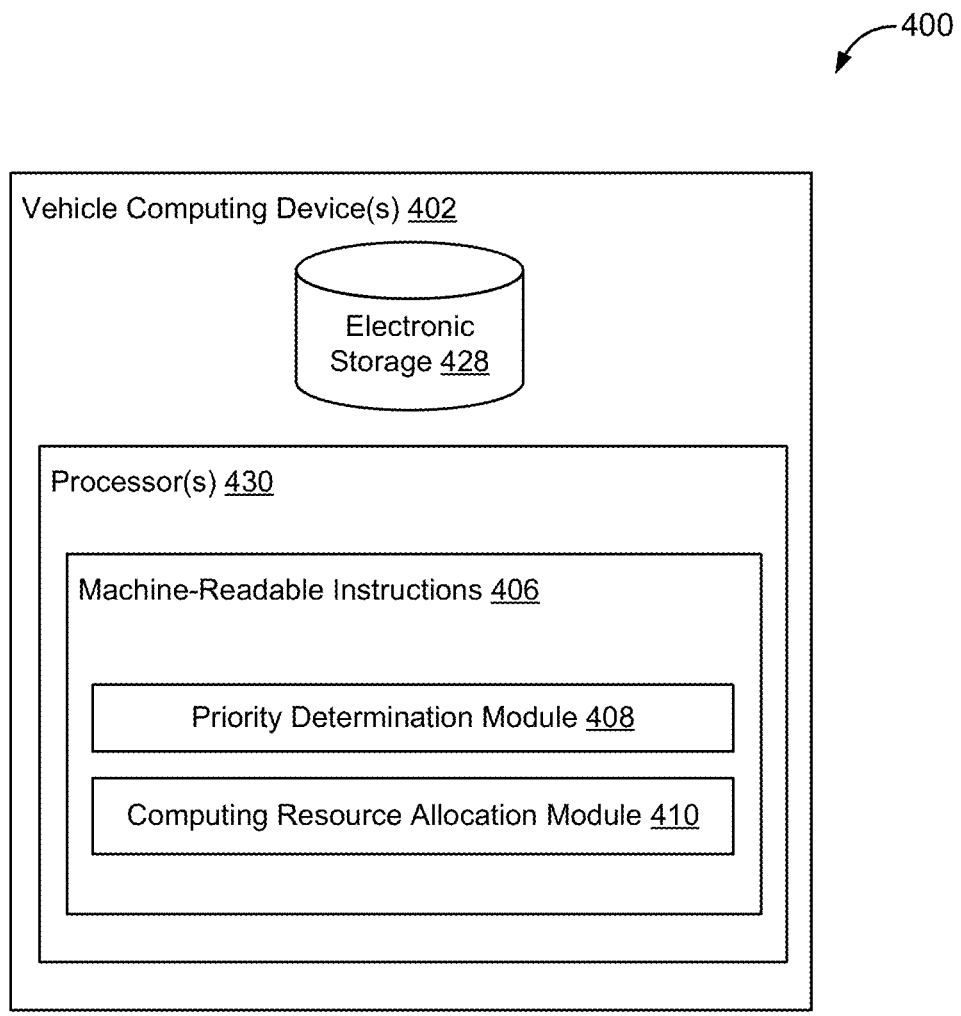
FIG. 4 is a component block diagram of an example system configured for allocating processing resources to concurrently-executing neural networks according to various embodiments.

FIG. 4 is a component block diagram illustrating a system 400 configured for allocating computing resources to an application performed by a processor of a vehicle in accordance with various embodiments. In some embodiments, the system 400 may include one or more vehicle computing devices 402 and/or one or more remote platforms 404. With reference to FIGS. 1A-4, the vehicle computing device(s) 402 may include one or more processors 430, such as processor 164, a processing device 300, and/or a control unit 140 (variously referred to as a "processor" 430) of a vehicle (e.g., 100). The remote platform(s) 404 may include a processor (e.g., 164), a processing device (e.g., 300), and/or a control unit (e.g., 140) (variously referred to as a "processor") of a vehicle (e.g., 100).

The vehicle computing device(s) 402 may include one or more processors 430 configured by machine-executable instructions 406. Machine-executable instructions 406 may include one or more instruction modules. The instruction modules may include computer program modules. The instruction modules may include one or more of a priority determination module 408, a computing resource allocation module 410, and/or other instruction modules.

The priority determination module 408 may be configured to determine a priority of each of a plurality of neural networks executing on a vehicle processing system based on a contribution of each neural network to overall vehicle safety performance.

The computing resource allocation module 410 may be configured to allocate computing resources to each of the plurality of neural networks based on the determined priority of each neural network.

Vehicle computing device(s) 402 may include electronic storage 428, one or more processors 430, and/or other components. Vehicle computing device(s) 402 may include communication lines, or ports to enable the exchange of information with a network and/or other vehicle computing devices. Illustration of vehicle computing device(s) 402 in FIG. 4 is not intended to be limiting. Vehicle computing device(s) 402 may include a plurality of hardware, software, and/or firmware components operating together to provide the functionality attributed herein to vehicle computing device(s) 402. For example, vehicle computing device(s) 402 may be implemented by a cloud of vehicle computing devices operating together as vehicle computing device(s) 402.

Electronic storage 428 may include non-transitory storage media that electronically stores information. The electronic storage media of electronic storage 428 may include one or both of system storage that is provided integrally (i.e., substantially non-removable) with vehicle computing device(s) 402 and/or removable storage that is removably connectable to vehicle computing device(s) 402 via, for example, a port (e.g., a Universal Serial Bus (USB) port, a firewire port, etc.) or a drive (e.g., a disk drive, etc.). Electronic storage 428 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 428 may include one or more virtual storage resources (e.g., cloud storage, a virtual private network, and/or other virtual storage resources). Electronic storage 428 may store software algorithms, information determined by processor(s) 430, information received from vehicle computing device(s) 402 and/or other information that enables vehicle computing device(s) 402 to function as described herein.

Processor(s) 430 may be configured to provide information processing capabilities in vehicle computing device(s) 402. As such, the processor(s) 430 may include one or more of a digital processor, an analog processor, a digital circuit designed to process information, an analog circuit designed to process information, a state machine, and/or other mechanisms for electronically processing information. Although the processor(s) 430 is shown in FIG. 4 as a single entity, this is for illustrative purposes only. In some implementations, the processor(s) 430 may include a plurality of processing units and/or processor cores. The processing units may be physically located within the same device, or processor(s) 430 may represent processing functionality of a plurality of devices operating in coordination. The processor(s) 430 may be configured to execute modules 408, 410, and/or other modules by software; hardware; firmware; some combination of software, hardware, and/or firmware; and/or other mechanisms for configuring processing capabilities on processor(s) 430. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 408 and 410 are illustrated in FIG. 4 as being implemented within a single processing unit, in implementations in which the processor(s) 430 includes multiple processing units and/or processor cores, one or more of modules 408 and 410 may be implemented remotely from the other modules. The description of the functionality provided by the different modules 408 and 410 described below is for illustrative purposes, and is not intended to be limiting, as any of modules 408 and 410 may provide more or less functionality than is described. For example, one or more of the modules 408 and 410 may be eliminated, and some or all of its functionality may be provided by other modules 408 and 410. As another example, the processor(s) 430 may be configured to execute one or more additional modules that may perform some or all of the functionality attributed below to one of the modules 408 and 410.

Figure 5A:
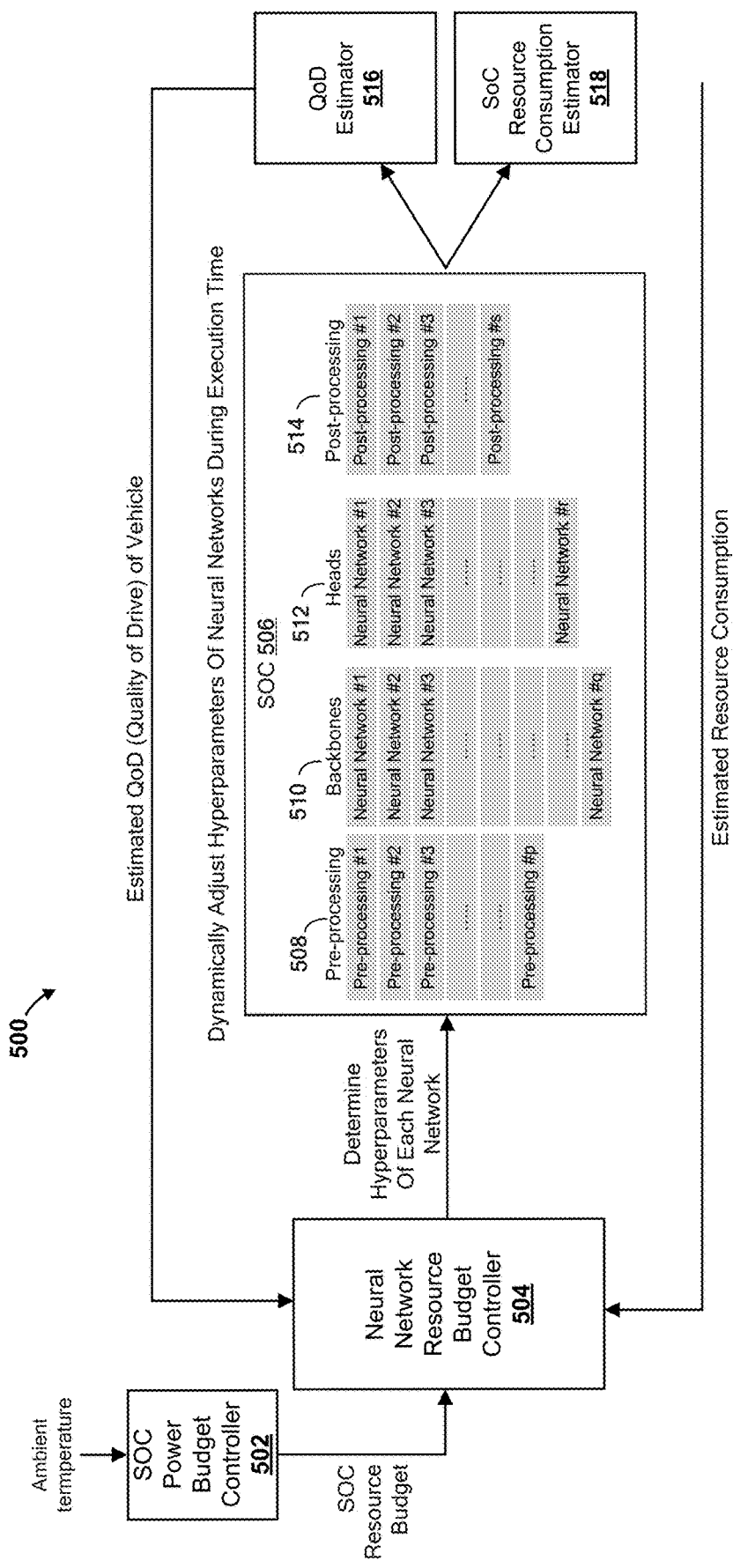
FIG. 5A is a conceptual diagram illustrating components of a vehicle computing system suitable for allocating processing resources to concurrently-executing neural networks according to various embodiments.

FIG. 5A is a conceptual diagram illustrating components of a vehicle computing system 500 for a method for allocating processing resources to concurrently-executing neural networks according to various embodiments. With reference to FIGS. 1-5A, in some embodiments the components may be implemented in hardware, software, or a combination of hardware and software, for example, by a processor (e.g., the processor 164, 303, 304, 306, 307, 308, 310, 317, 430) of a vehicle (e.g., the vehicle 100).

In some embodiments, the vehicle computing system 500 may execute many concurrent neural networks, and may dynamically evaluate and alter configurations, such as hyperparameters, of each of the concurrently-executing neural networks to increase a QoD metric within a budget of finite resources, such as a power budget, thermal budget, load budget, and/or the like of the computing system 500.

In some embodiments, a system-on-chip (SOC) resource budget controller 502 may receive, detect, or determine an ambient temperature of an operating environment of the vehicle. The SOC resource budget controller 502 may determine a resource budget for the SOC (e.g., a power budget, thermal budget, load budget, and/or the like), and may provide the resource budget to a neural network resource budget controller 504. The neural network resource budget controller 504 may determine hyperparameters of one or more concurrently-executing neural network and provide the determined hyperparameters to the SOC 506.

The SOC 506 may execute a plurality of neural networks, which may include a plurality pre-processing operations 508, a plurality backbones 510, a plurality of heads 512, and a plurality of post-processing operations 514. Examples of pre-processing operations 508 include image spatial calibration, format conversion, resolution scaling, noise reduction, and other image enhancement algorithms. Examples of post-processing operations 514 include object motion trace tracking, object filtering and prioritization, and other algorithms. Backbones 510 may use convolutional neural networks to extract features from the input image. Detection heads 512 may use neural networks to generate inference results such as object types (e.g., classifications) and object locations (e.g., horizontal and vertical coordinates). Based on the operations of the SOC 506, a QoD estimator 516 may determine an estimated QoD metric of the vehicle. Also, based at least in part on the operations of the SOC 506, an SOC resource consumption estimator 518 may determine a resource consumption of the vehicle computing system 500 (e.g., a consumption of power, generation of heat, consumption of computing resources, etc.). In some embodiments, the operations of the SOC 506 may be based on operations of the plurality of concurrently-executing neural networks. In turn, the operations of the plurality of concurrently-executing neural networks may be based on the hyperparameters of each neural network. The QoD estimator 516 may provide the estimated QoD metric of the vehicle to the neural network resource budget controller 504. The SOC resource consumption estimator 518 may provide the estimated resource consumption of the vehicle computing system 500 to the neural network resource budget controller 504.

Based on the estimated QoD metric of the vehicle and/or the estimated resource consumption of the vehicle computing system 500, the neural network resource budget controller 504 may determine one or more adjusted hyperparameters for one or more of the neural networks within the SOC resource budget. The neural network resource budget controller 504 may provide the one or more adjusted hyperparameters to the SOC 506, and the SOC 506 may implement the one or more adjusted hyperparameters in the applicable neural network. Examples of hyperparameters that may be adjusted include a pruning level, a parameter quantization, inferences per second, a neural network configuration, an input resolution, a batch size, a field of view, an input image partial mask based on contextual map, and/or other suitable hyperparameters.

FIG. 5B is a table illustrating functions 530 that may be performed by various neural networks. FIG. 5C is a table illustrating configurations 540 of hyperparameters of various neural networks. With reference to FIGS. 1-5C, in some embodiments the neural networks may be implemented in hardware, software, or a combination of hardware and software, for example, by a processor (e.g., the processor 164, 303, 304, 306, 307, 308, 310, 317, 430) of a vehicle (e.g., the vehicle 100). Referring to FIG. 5B, for example, a vehicle ADAS may provide a variety of functions, such as dynamic rerouting of a vehicle course or path, weather detection, backward collision morning, forward collision warning, and blind spot detection (e.g., of obstacles, people, etc.), as well as or in addition to other functions. Each of the functions of the vehicle ADAS may be performed by a concurrently-executing neural network, examples of which include DenseNet, VGG16, RESNET50, MobileNet, Inception, and/or other neural networks. Referring to FIG. 5C, each of the neural networks may be configured with a variety of hyperparameters, such as a quantization level, a pruning level parameter, an input resolution, a number of inferences per second, and/or other suitable parameters or configurations.

Figure 5D:
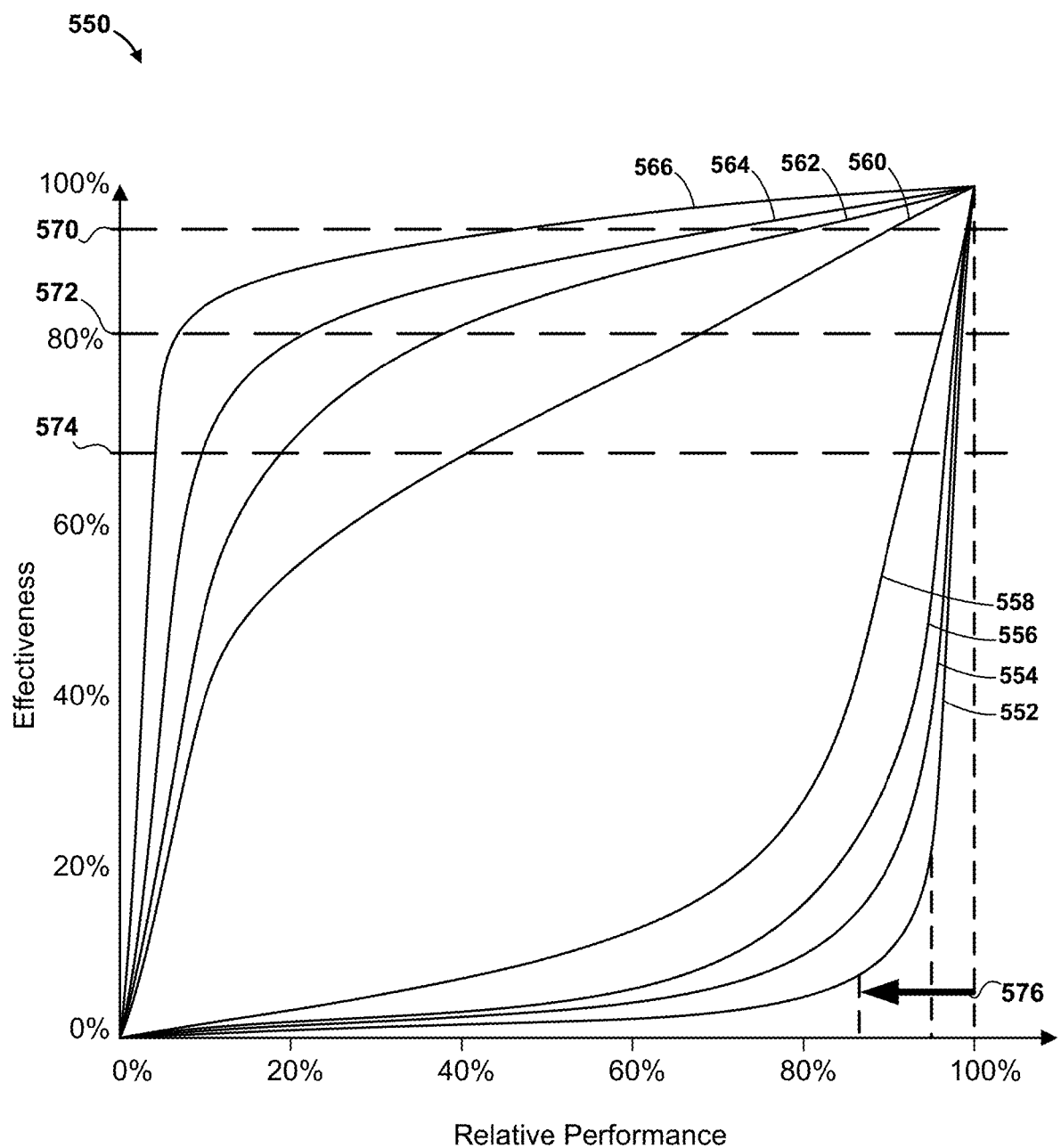
FIG. 5D is graph and illustration of an example of performance-effectiveness curves of neural networks according to various embodiments.

FIG. 5D is graph and illustration of an example of performance-effectiveness curves 550 of eight neural networks 552-566. With reference to FIGS. 1-5D, in some embodiments the neural networks may be implemented in hardware, software, or a combination of hardware and software, for example, by a processor (e.g., the processor 164, 303, 304, 306, 307, 308, 310, 317, 430) of a vehicle (e.g., the vehicle 100). The four curves 552, 554, 556, and 558 represent higher priority neural networks, i.e., neural networks that perform higher priority functions. For example, neural network 552 may perform a forward collision prevention function, neural network 554 may perform a lane keeping assistance function, neural network 556 may perform blind spot detection function, and neural network 558 may perform a backward collision avoidance function. The four curves 560, 562, 564, and 566 represent lower priority neural networks, i.e., neural networks that perform lower priority functions. For example, the neural network 560 may perform a lane change frequency function, the neural network 562 may perform a dynamic rerouting frequency function, the neural network 564 may perform a weather detection function, and the neural network 566 may perform a vehicle night vision function.

In various embodiments, horizontal lines 570, 572, and 574 represents an overall evaluation of the performance of each of the neural networks 552-566, or QoD metric, based on an effectiveness and a relative performance of each of the neural networks 552-566. In some embodiments, QoD metric 570 may represent a high performance, best performance, or maximum performance of a neural network. In some embodiments, QoD metric 572 may represent an intermediate performance of a neural network. In some embodiments, QoD metric 574 may represent a minimum allowed or minimum tolerated performance from each neural network. The arrow 576 illustrates that reducing a processor resource (e.g., an operating frequency of the CPU, GPU, etc.) decreases a relative performance of the neural networks 552-566, and that the decrease in relative performance is substantially different for the neural networks 552-558 as compared to the neural networks 560-566.

As noted above, in some embodiments, the QoD metric may be represented as:

$$QoD = \min(\text{effectiveness}_{per\ function})$$

and may be based on the estimated QoD metric of the vehicle and the estimated consumption of budgeted resources. In some embodiments, a determination of an effectiveness of a neural network may depend in part on a categorization of the neural network as performing a relatively high priority function or a relatively low priority function with regard to safe vehicle operation. In some embodiments, an effectiveness of a relatively high priority function (HPF) (such as the neural networks 552, 554, 556, and 558) may be represented as:

$$\text{effectiveness HPF} = \text{relative performance}^{4\times(\#functions-rank)}$$

in which "#functions" represents a volume of output, such as a number of inferences per second, or a number of frames output per second; and "rank" represents a priority assigned to the neural network. In some embodiments, an effectiveness of a relatively low priority function (LPF) (such as the neural networks 560, 562, 564, and 566) may be represented as:

$$\text{effectiveness } LPF = \text{relative } performance^{\frac{1}{4\times rank}}.$$

In some embodiments, the processing system may adjust the one or more hyperparameters of each neural network based on a performance-effectiveness curve of one or more of the plurality of neural networks. In some embodiments, performance-effectiveness curve may include a measure of the effect of adjusting hyperparameters has on the performance of each neural network. In some embodiments, each performance-effectiveness curve may be based on an evaluation of the effectiveness versus the relative performance of each neural network. In some embodiments, the processing system may adjust the one or more hyperparameters based on a performance-effectiveness curve of one or more of the plurality of neural networks.

Figure 5E:
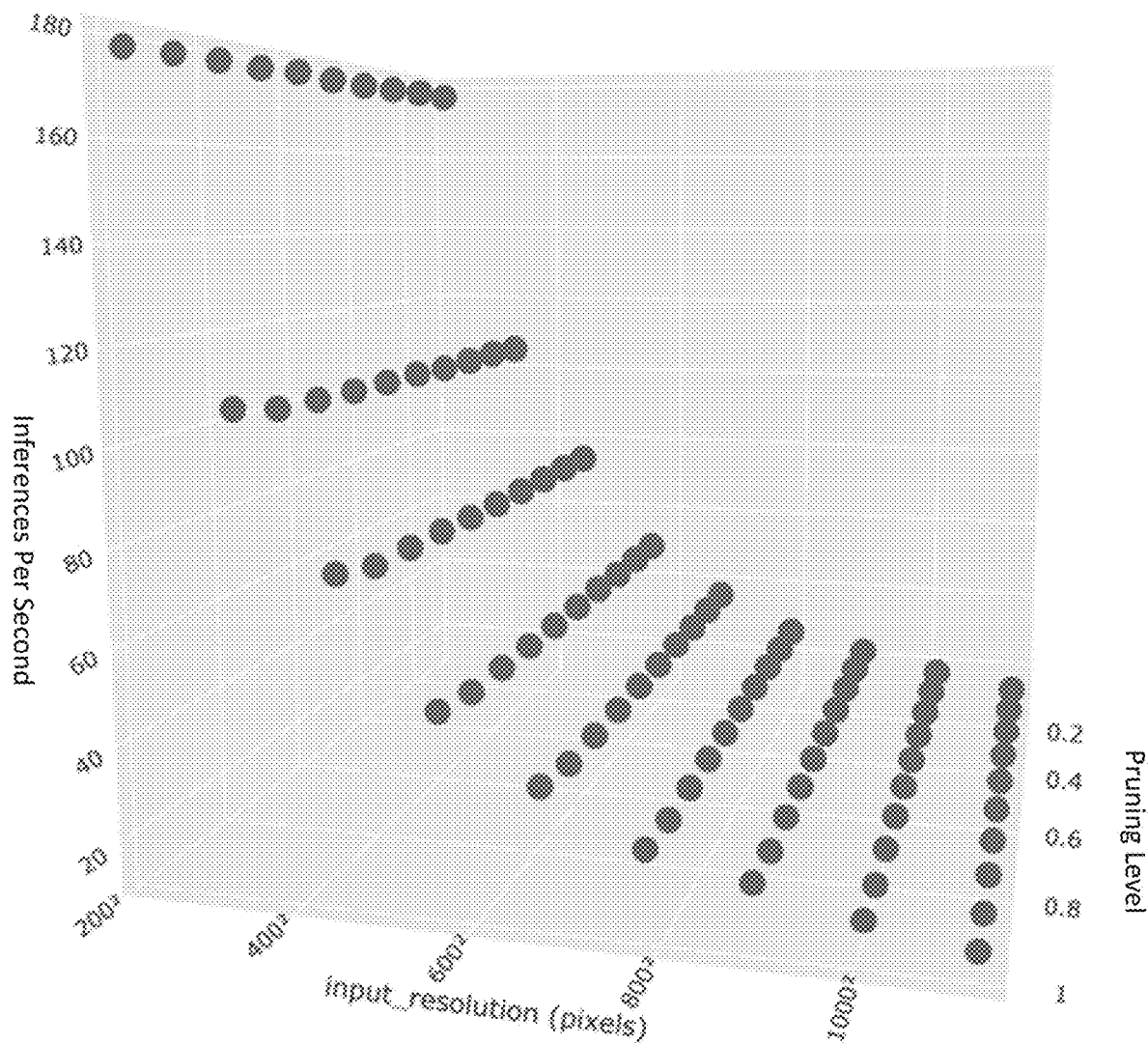
FIGS. 5E, 5F, and 5G are graphs and illustrations of examples of an effect of adjusting hyperparameters in accordance with various embodiments.
Figure 5F:
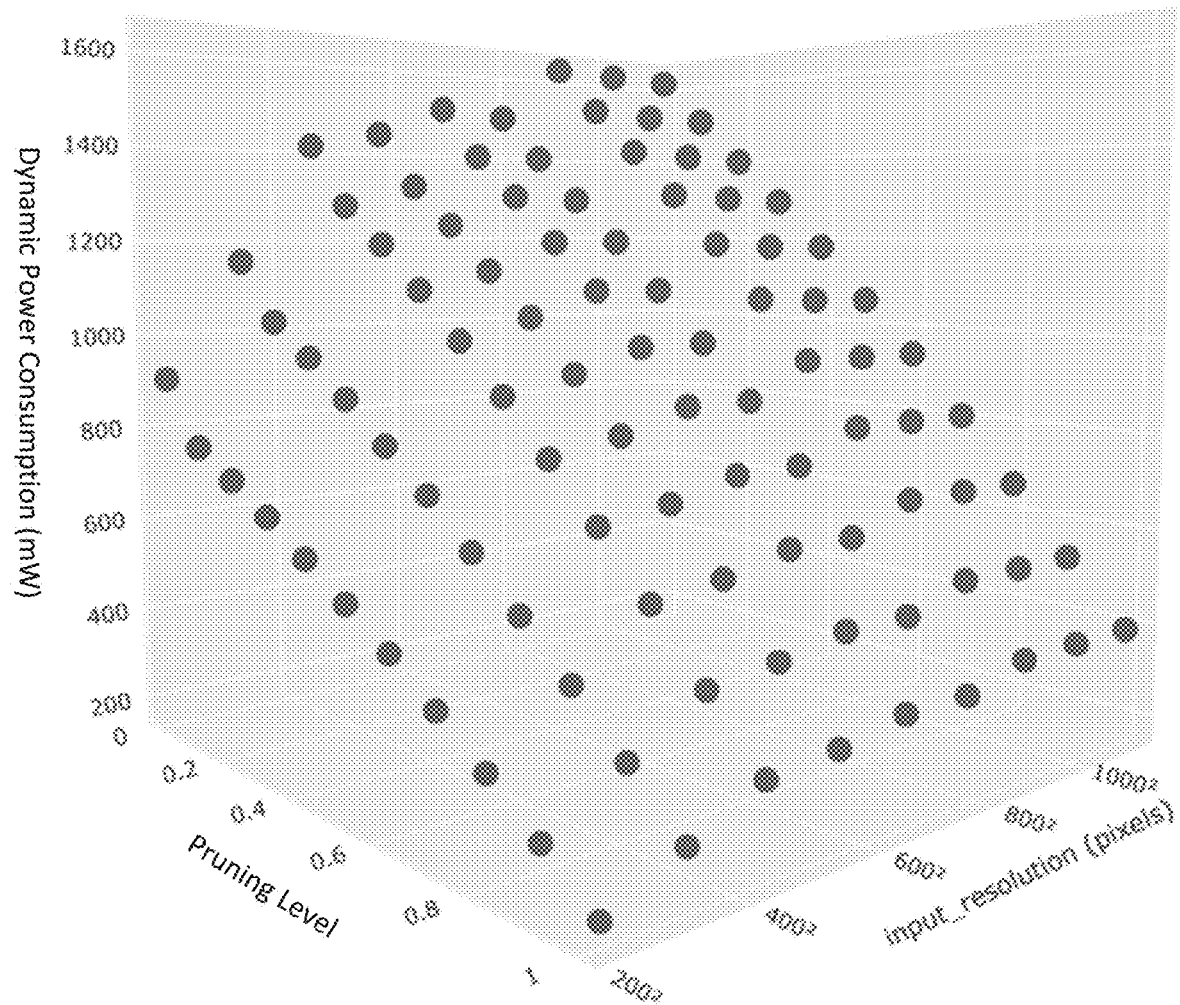
Figure 5G:
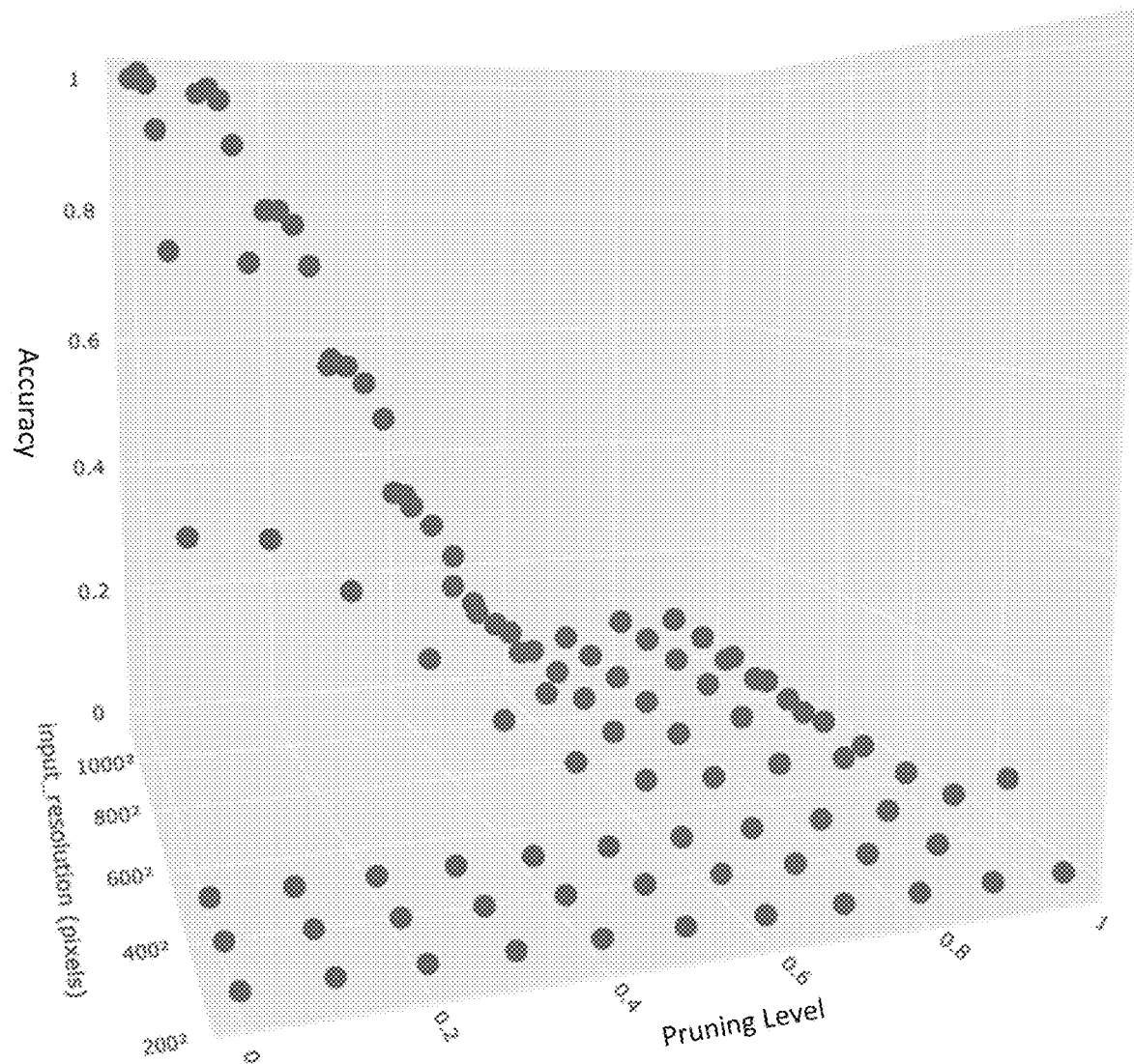

FIGS. 5E, 5F, and 5G are graphs and illustrations of examples of various effects of adjusting hyperparameters in accordance with various embodiments. Adjusting hyperparameters of a neural network enables control of power consumption and/or processing time of the neural network. Changing hyperparameters may also affect accuracy and inferences per second of a neural network. For example, FIG. 5E illustrates an example of how changes in input resolution (in terms of pixels) and neural network pruning level may affect the number of inferences that may be generated per second. As another example, FIG. 5F illustrates an example of how changes in input resolution (in terms of pixels) and neural network pruning level may affect dynamic power consumption of a processor executing a neural network. As another example, FIG. 5G illustrates an example of how changes in input resolution (in terms of pixels) and neural network pruning level may affect the accuracy of inferences of a neural network. Such changes in power consumption, inference accuracy, and inference per second in response to changes in pruning level and input resolution hyperparameters may be modeled based on testing or offline simulation (e.g., during a design phase).

Figure 5H:
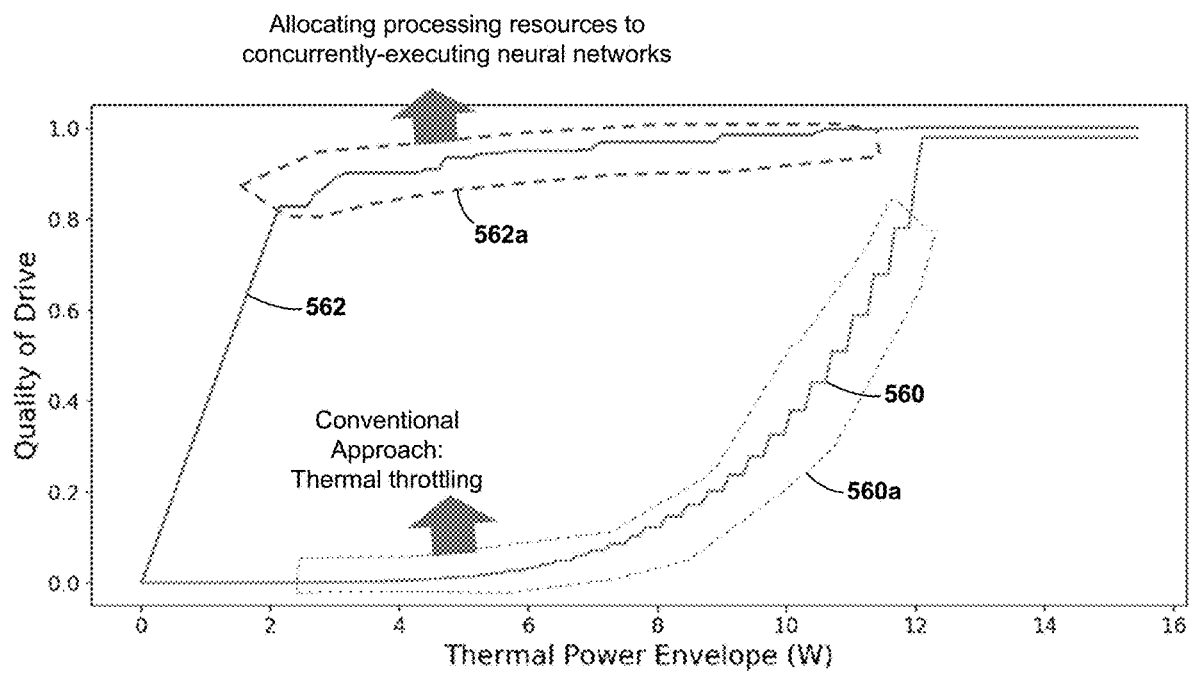
FIG. 5H is a graph and illustration of a comparison of thermal throttling and allocating processing resources to concurrently-executing neural networks in accordance with various embodiments.

FIG. 5H is a graph and illustration of a comparison of thermal throttling and allocating processing resources to concurrently-executing neural networks in accordance with various embodiments. Curve 560 illustrates an effect of thermal throttling on QoD, and curve 562 illustrates an effect of allocating processing resources to concurrently-executing neural networks on QoD. Curve 560 illustrates a dramatic reduction in QoD as a thermal power envelope, measured in Watts (W), decreases, such as a reduction in the thermal power budget. The region 560a of the curve 560 illustrates that as the thermal power envelope decreases, the QoD rapidly approaches zero, indicating significant degradation in the QoD. In contrast, curve 562 illustrates that dynamically allocating processing resources to concurrently-executing neural networks maintains a relatively high QoD even when the thermal power envelope (e.g., the thermal power budget) decreases significantly. In particular, region 562a of the curve 562 illustrates that as the thermal power envelope decreases, a relatively small decreases in QoD occurs.

In some embodiments, the decrease of the QoD illustrated in the region 562a may be imperceptible or minimally perceptible to a human passenger. In some embodiments, the thermal power budget envelope—which may correlate to power consumption by an SoC (e.g., the SoC 506)—may decrease 30-50% with a relatively minimal decrease in the QoD. The curve 562 illustrates a scenario in which the thermal power envelope is reduced (e.g., a thermal-power constrained scenario), yet the QoD remains 3- to 4-times better than the QoD resulting from thermal throttling as illustrated in the curve 560. In some embodiments, such results may be achieved automatically through operations of allocating processing resources to concurrently-executing neural networks as opposed to through manual optimization performed during software development.

Figure 6A:
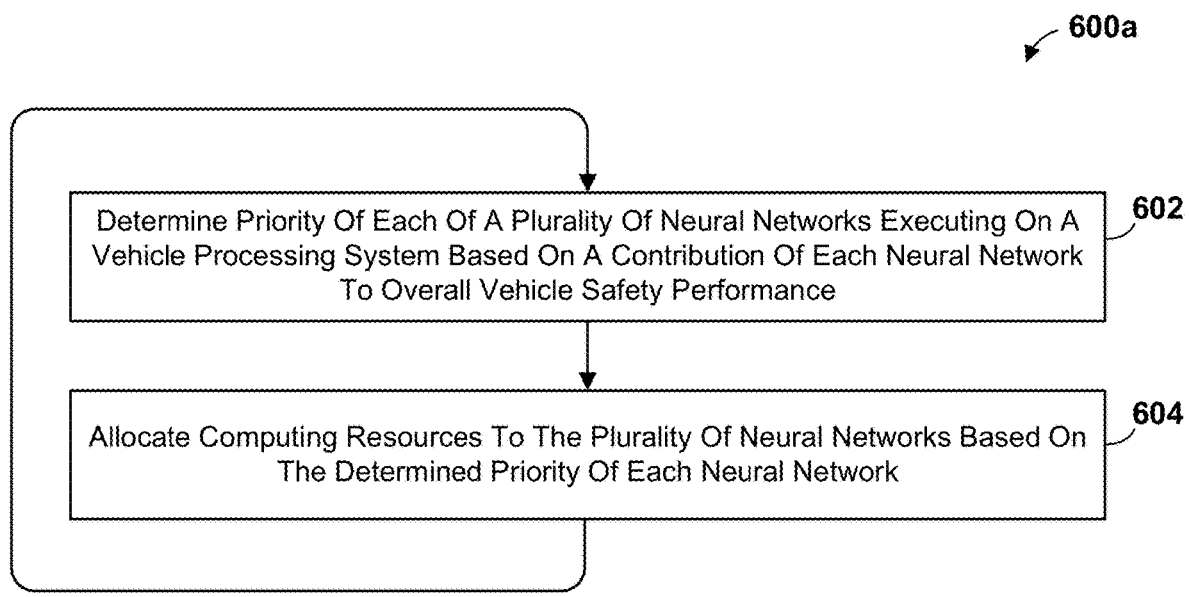
FIG. 6A is a process flow diagram illustrating operations of a method that may be performed by a processor of a vehicle for allocating processing resources to concurrently-executing neural networks in accordance with various embodiments.

FIG. 6A is a process flow diagram illustrating operations of a method 600a that may be performed by a processor of a vehicle for allocating processing resources to concurrently-executing neural networks in accordance with various embodiments. With reference to FIGS. 1-6A, the operations of the method 600a may be performed by a processor (e.g., the processor 164, 303, 304, 306, 307, 308, 310, 317, 430) of a vehicle (e.g., the vehicle 100).

In block 602, the processor may determine a priority of one or more (e.g., each) of a plurality of neural networks executing on a vehicle processing system based on a contribution of one or more (e.g., each) neural network to overall vehicle safety performance. In some embodiments, the processor may determine the priority of one or more (e.g., each) of the plurality of neural networks executing on a vehicle processing system based on a contribution of one or more (e.g., each) neural network to overall vehicle safety performance in a vehicle operation context. In some embodiments, the processor may determine the priority of one or more (e.g., each) of a plurality of neural networks executing on a vehicle processing system based on an indication provided by one or more (e.g., each) neural network of a contribution of that neural network to overall vehicle safety performance. In some embodiments, the processor may determine a relative performance of one or more of the plurality of neural networks based on output inferences per second and an output accuracy of one or more (e.g., each) neural network. Means for performing the operations of block 602 may include the processor 164, 303, 304, 306, 307, 308, 310, 317, 430.

In block 604, the processor may allocate computing resources to one or more (e.g., each) of the plurality of neural networks based on the determined priority of one or more (e.g., each) neural network. In some embodiments, allocating computing resources to the plurality of neural networks based on the determined priority of one or more (e.g., each) neural network may include adjusting one or more hyperparameters of one or more of the plurality of neural networks based on the determined priority of the one or more the plurality of neural networks. In some embodiments, the processor may adjust the one or more hyperparameters based on a performance-effectiveness curve of one or more of the plurality of neural networks.

Means for performing the operations of block 604 may include the processor 164, 303, 304, 306, 307, 308, 310, 317, 430.

In some embodiments, the processor may iteratively perform the operations of block 602 in block 604. In this manner, the processor may dynamically allocate processing resources to the plurality of concurrently-executing neural networks.

Figure 6B:
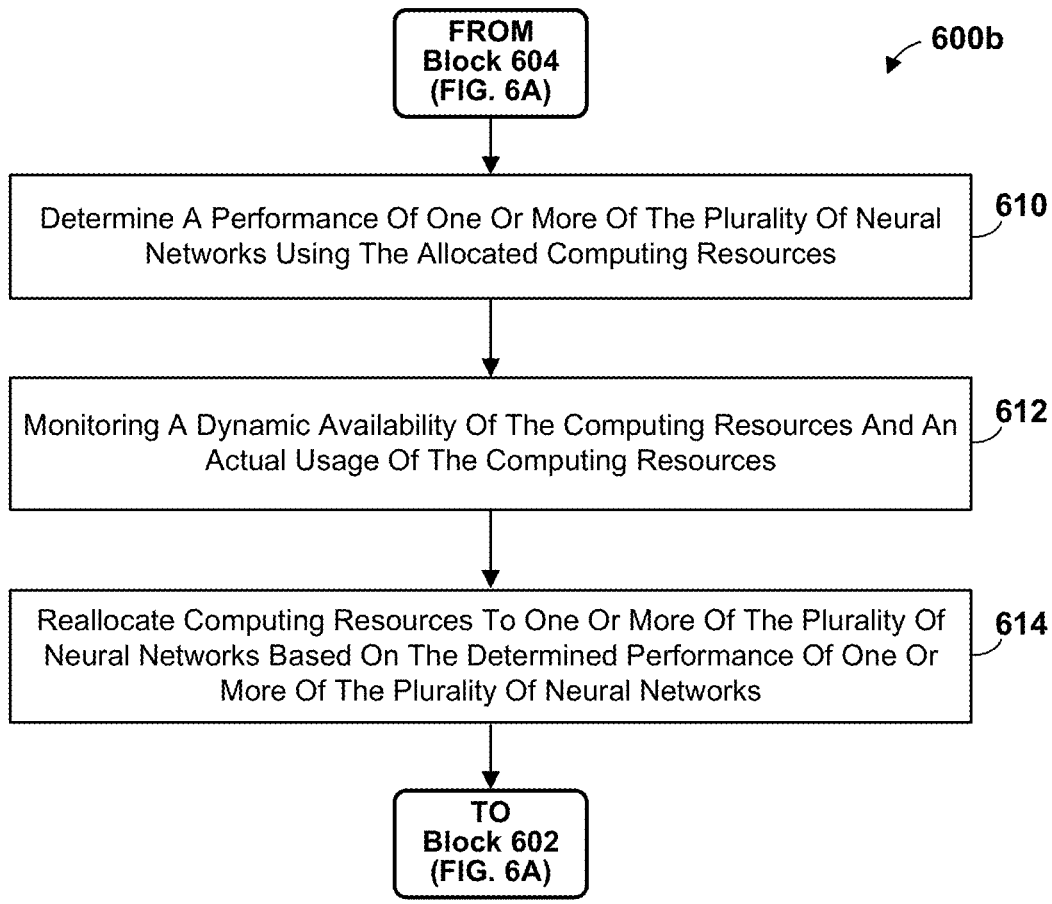
FIGS. 6B and 6C are process flow diagrams illustrating operations that may be performed by a processor of a vehicle as part of the method for allocating processing resources to concurrently-executing neural networks in accordance with various embodiments.
Figure 6C:
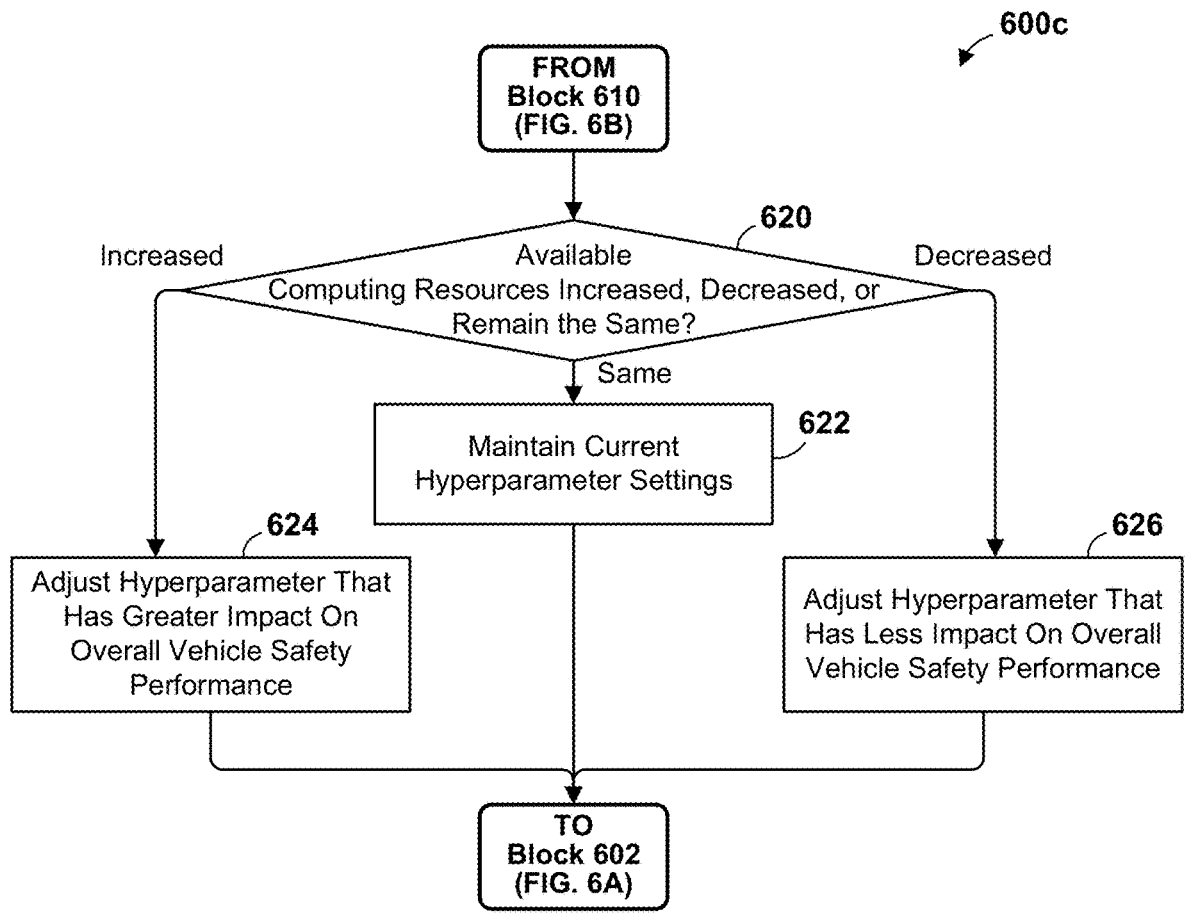

FIGS. 6B and 6C are process flow diagrams illustrating operations 600b and 600c that may be performed by a processor of a vehicle as part of the method 600a for allocating processing resources to concurrently-executing neural networks in accordance with various embodiments. With reference to FIGS. 1-6CB, the operations 600b and 600c may be performed by a processor (e.g., the processor 164, 303, 304, 306, 307, 308, 310, 317, 430) of a vehicle (e.g., the vehicle 100).

With reference to FIG. 6B, in some embodiments, following the performance of the operations of block 604 of the method 600a (FIG. 6A), the processor may determine a performance of one or more of the plurality of neural networks using the allocated computing resources in block 610. In some embodiments, the processor may determine an effectiveness of one or more of the neural networks. In some embodiments, the processor may determine the actual usage of the computing resources based on computing resources used by each neural network (e.g., as a percentage, a proportion, or another measure). Means for performing the operations of block 610 may include the processor 164, 303, 304, 306, 307, 308, 310, 317, 430.

In block 612, the processor may monitor a dynamic availability of the computing resources and actual usage of the computing resources. In some embodiments, the processor may determine the dynamic availability of computing resources based on a change in demand for computing resources. Such a change in demand for computing resources may be based on an increase or decrease in importance of one or more of the plurality of neural networks. A change in importance of the one or more neural networks may be based on a change in the vehicle's operating context, such as a change in the operating status and/or environment. In some embodiments, the processor may determine that an availability of the computing resources has increased or decreased. Means for performing the operations of block 612 may include the processor 164, 303, 304, 306, 307, 308, 310, 317, 430.

In block 614, the processor may reallocate computing resources to one or more of the plurality of neural networks based on the determined performance of one or more of the plurality of neural networks. In some embodiments, the processor may readjust one or more hyperparameters of one or more of the plurality of neural networks based on the determined performance of one or more (e.g., each) of the plurality of neural networks. Means for performing the operations of block 614 may include the processor 164, 303, 304, 306, 307, 308, 310, 317, 430.

The processor may then perform the operations of block 602 of the method 600a (FIG. 6A).

With reference to FIG. 6C, following the performance of the operations of block 610 (FIG. 6B), the processor may determine whether available computing resources have increased, decreased, or remain the same in determination block 620. Means for performing the operations of block 620 may include the processor 164, 303, 304, 306, 307, 308, 310, 317, 430.

In response to determining that the available computing resources remain the same (i.e., determination block 620="Same"), the processor may maintain current hyperparameter settings in block 622.

In response to determining that the available computing resources have increased (i.e., determination block 620="Increased"), the processor may adjust a hyperparameter that has a greater impact on overall vehicle safety performance in block 624.

In response to determining that the available computing resources have decreased (i.e., determination block 620="Decreased"), the processor may adjust a hyperparameter that has less impact on overall vehicle safety performance in block 626.

In various embodiments, the processor may determine an impact of a hyperparameter adjustment on the overall vehicle safety performance based on the relative importance of one or more neural networks affected by the hyperparameter to be adjusted.

Following performance of the operations of block 622, block 624, or block 626, the processor may perform the operations of block 602 of the method 600a (FIG. 6A) as described.

Implementation examples are described in the following paragraphs. While some of the following implementation examples are described in terms of example methods, further example implementations may include: the example methods discussed in the following paragraphs implemented by a vehicle computing system comprising a processor configured with processor-executable instructions to perform operations of the methods of the following implementation examples; the example methods discussed in the following paragraphs implemented by a vehicle computing system comprising means for performing functions of the methods of the following implementation examples; and the example methods discussed in the following paragraphs may be implemented as a non-transitory processor-readable storage medium having stored thereon processor-executable instructions configured to cause a processor of a vehicle computing system to perform the operations of the methods of the following implementation examples.

Example 1. A method performed by a processor of a vehicle for allocating computing resources to concurrently-executing neural networks, comprising: determining a priority of each of a plurality of neural networks executing on a vehicle processing system based on a contribution of each neural network to overall vehicle safety performance; and allocating computing resources to the plurality of neural networks based on the determined priority of each neural network.

Example 2. The method of example 1, wherein determining a priority of each of a plurality of neural networks executing on a vehicle processing system based on a contribution of each neural network to overall vehicle safety performance comprises determining the priority of each of the plurality of neural networks executing on the vehicle processing system based on a contribution of each neural network to the overall vehicle safety performance in a vehicle operation context.

Example 3. The method of example 1 or 2, wherein determining a priority of each of a plurality of neural networks executing on a vehicle processing system based on a contribution of each neural network to overall vehicle safety performance comprises determining the priority of each of the plurality of neural networks executing on the vehicle processing system based on an indication provided by each neural network of a contribution of that neural network to the overall vehicle safety performance.

Example 4. The method of any of examples 1-3, wherein the overall vehicle safety performance is calculated based on a model using inference accuracy and speed of the plurality of neural networks as input values.

Example 5. The method of any of examples 1-4, wherein the overall vehicle safety performance indicates a quality of drive based on at least in part on factors that are perceptible by a human passenger.

Example 6. The method of any of examples 1-5, wherein determining a priority of each of the plurality of neural networks executing on the vehicle processing system comprises determining a relative performance of one or more of the plurality of neural networks based on an output inferences per second and an output accuracy of each neural network.

Example 7. The method of any of examples 1-6, wherein allocating computing resources to the plurality of neural networks based on the determined priority of each neural network comprises adjusting one or more hyperparameters of one or more of the plurality of neural networks based on the determined priority of the one or more the plurality of neural networks.

Example 8. The method of example 7, wherein adjusting one or more hyperparameters of one or more of the plurality of neural networks based on the determined priority of the one or more the plurality of neural networks comprises adjusting one or more hyperparameters based on a performance-effectiveness curve of one or more of the plurality of neural networks.

Example 9. The method of any of examples 1-8, further comprising: determining a performance of one or more of the plurality of neural networks using the allocated computing resources; and reallocating computing resources to one or more of the plurality of neural networks based on the determined performance of one or more of the plurality of neural networks.

Example 10. The method of example 9, further comprising monitoring a dynamic availability of the computing resources and an actual usage of the computing resources, wherein reallocating computing resources to one or more of the plurality of neural networks based on the determined performance of one or more of the plurality of neural networks comprises reallocating computing resources to one or more of the plurality of neural networks based on the dynamic availability of computing resources and actual usage of the computing resources.

Example 11. The method of example 9, wherein reallocating computing resources to one or more of the plurality of neural networks based on the determined performance of one or more of the plurality of neural networks comprises readjusting one or more hyperparameters of one or more of the plurality of neural networks based on the determined performance of each of the plurality of neural networks.

Example 12. The method of any of examples 1-11, further comprising: determining whether available computing resources have increased, decreased, or remain the same, and adjusting one or more neural network hyperparameters that have a relatively greater effect on overall vehicle safety performance in response to determining that the available computing resources have increased.

Example 13. The method of example 12, further comprising adjusting one or more neural network hyperparameters that have a relatively less effect on overall vehicle safety performance in response to determining that the available computing resources have decreased.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the blocks of various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of various embodiments.

The hardware used to implement the various illustrative logics, logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of communication devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In various embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present embodiments. Various modifications to these embodiments will be readily apparent to those skilled in the art, and the generic principles defined herein may be applied to other embodiments without departing from the scope of the embodiments. Thus, various embodiments are not intended to be limited to the embodiments shown herein but are to be accorded the widest scope consistent with the following claims and the principles and novel features disclosed herein.

What is claimed is:

1. A method performed by a processor of a vehicle for allocating computing resources to concurrently-executing neural networks, comprising:
   determining a priority of each of a plurality of neural networks executing on a vehicle processing system based on a contribution of each neural network to overall vehicle safety performance; and
   allocating computing resources to the plurality of neural networks based on the determined priority of each neural network.

2. The method of claim 1, wherein determining a priority of each of a plurality of neural networks executing on a vehicle processing system based on a contribution of each neural network to overall vehicle safety performance comprises determining the priority of each of the plurality of neural networks based on a contribution of each neural network to the overall vehicle safety performance in a vehicle operation context.

3. The method of claim 1, wherein determining a priority of each of a plurality of neural networks executing on a vehicle processing system based on a contribution of each neural network to overall vehicle safety performance comprises determining the priority of each of the plurality of neural networks based on an indication of a contribution of that neural network to the overall vehicle safety performance, wherein the indication is provided by each neural network.

4. The method of claim 1, wherein the overall vehicle safety performance is calculated based on a model using inference accuracy and speed of the plurality of neural networks as input values.

5. The method of claim 1, wherein the overall vehicle safety performance indicates a quality of drive that is based on factors that are perceptible by a human passenger.

6. The method of claim 1, wherein determining a priority of each of the plurality of neural networks executing on the vehicle processing system comprises determining a relative performance of one or more of the plurality of neural networks based on an output inferences per second and an output accuracy of each neural network.

7. The method of claim 1, wherein allocating computing resources to the plurality of neural networks based on the determined priority of each neural network comprises adjusting one or more hyperparameters of one or more of the plurality of neural networks based on the determined priority of the one or more the plurality of neural networks.

8. The method of claim 7, wherein adjusting one or more hyperparameters of one or more of the plurality of neural networks based on the determined priority of the one or more the plurality of neural networks comprises adjusting one or more hyperparameters based on a performance-effectiveness curve of one or more of the plurality of neural networks.

9. The method of claim 1, further comprising:
   determining a performance of one or more of the plurality of neural networks using the allocated computing resources; and
   reallocating computing resources to one or more of the plurality of neural networks based on the determined performance of one or more of the plurality of neural networks.

10. The method of claim 9, further comprising:
monitoring a dynamic availability of the computing resources and an actual usage of the computing resources,
wherein reallocating computing resources to one or more of the plurality of neural networks based on the determined performance of one or more of the plurality of neural networks comprises reallocating computing resources to one or more of the plurality of neural networks based on the dynamic availability of the computing resources and the actual usage of the computing resources.

11. The method of claim 9, wherein reallocating computing resources to one or more of the plurality of neural networks based on the determined performance of one or more of the plurality of neural networks comprises readjusting one or more hyperparameters of one or more of the plurality of neural networks based on the determined performance of each of the plurality of neural networks.

12. The method of claim 1, further comprising:
determining whether available computing resources have increased, decreased, or remain the same;
adjusting one or more neural network hyperparameters that have a relatively greater effect on overall vehicle safety performance in response to determining that the available computing resources have increased; and
adjusting one or more neural network hyperparameters that have a relatively less effect on overall vehicle safety performance in response to determining that the available computing resources have decreased.

13. A processing system, comprising:
a processor configured with processor-executable instructions to:
determine a priority of each of a plurality of neural networks executing on a vehicle processing system based on a contribution of each neural network to overall vehicle safety performance; and
allocate computing resources to the plurality of neural networks based on the determined priority of each neural network.

14. The processing system of claim 13, wherein the processor is further configured with processor-executable instructions to determine the priority of each of the plurality of neural networks executing on the vehicle processing system based on a contribution of each neural network to the overall vehicle safety performance in a vehicle operation context.

15. The processing system of claim 13, wherein the processor is further configured with processor-executable instructions to determine the priority of each of the plurality of neural networks executing on the vehicle processing system based on an indication provided by each neural network of a contribution of that neural network to the overall vehicle safety performance.

16. The processing system of claim 13, wherein the processor is further configured with processor-executable instructions such that the overall vehicle safety performance is calculated based on a model using inference accuracy and speed of the plurality of neural networks as input values.

17. The processing system of claim 13, wherein the processor is further configured with processor-executable instructions such that the overall vehicle safety performance indicates a quality of drive that is based on factors perceptible by a human passenger.

18. The processing system of claim 13, wherein the processor is further configured with processor-executable instructions to determine a relative performance of one or more of the plurality of neural networks based on an output inferences per second and an output accuracy of each neural network.

19. The processing system of claim 13, wherein the processor is further configured with processor-executable instructions to adjust one or more hyperparameters of one or more of the plurality of neural networks based on the determined priority of the one or more the plurality of neural networks.

20. The processing system of claim 19, wherein the processor is further configured with processor-executable instructions to adjust the one or more hyperparameters based on a performance-effectiveness curve of one or more of the plurality of neural networks.

21. The processing system of claim 13, wherein the processor is further configured with processor-executable instructions to:
determine a performance of one or more of the plurality of neural networks using the allocated computing resources; and
reallocate computing resources to one or more of the plurality of neural networks based on the determined performance of one or more of the plurality of neural networks.

22. The processing system of claim 21, wherein the processor is further configured with processor-executable instructions to:
monitor a dynamic availability of the computing resources and an actual usage of the computing resources; and
reallocate computing resources to one or more of the plurality of neural networks based on the dynamic availability of the computing resources and the actual usage of the computing resources.

23. The processing system of claim 13, wherein the processor is further configured with processor-executable instructions to readjust one or more hyperparameters of one or more of the plurality of neural networks based on the determined performance of each of the plurality of neural networks.

24. The processing system of claim 13, wherein the processor is further configured with processor-executable instructions to:
determine whether available computing resources have increased, decreased, or remain the same;
adjust one or more neural network hyperparameters that have a relatively greater effect on overall vehicle safety performance in response to determining that the available computing resources have increased; and
adjust one or more neural network hyperparameters that have a relatively less effect on overall vehicle safety performance in response to determining that the available computing resources have decreased.

25. A non-transitory processor-readable medium having stored thereon processor-executable instruction configured to cause a processing device of a vehicle to perform operations comprising:
determining a priority of each of a plurality of neural networks executing on a vehicle processing system based on a contribution of each neural network to overall vehicle safety performance; and
allocating computing resources to the plurality of neural networks based on the determined priority of each neural network.

26. A processing system, comprising:
means for determining a priority of each of a plurality of neural networks executing on a vehicle processing system based on a contribution of each neural network to overall vehicle safety performance; and means for allocating computing resources to the plurality of neural networks based on the determined priority of each neural network.

27. The processing system of claim 26, wherein means for determining a priority of each of a plurality of neural networks executing on a vehicle processing system based on a contribution of each neural network to overall vehicle safety performance comprises means for determining the priority of each of the plurality of neural networks executing on the vehicle processing system based on a contribution of each neural network to the overall vehicle safety performance in a vehicle operation context.

28. The processing system of claim 26, wherein means for determining a priority of each of a plurality of neural networks executing on a vehicle processing system based on a contribution of each neural network to overall vehicle safety performance comprises means for determining the priority of each of the plurality of neural networks executing on the vehicle processing system based on an indication provided by each neural network of a contribution of that neural network to the overall vehicle safety performance.

29. The processing system of claim 26, wherein means for determining a priority of each of the plurality of neural networks executing on the vehicle processing system comprises means for determining a relative performance of one or more of the plurality of neural networks based on an output inferences per second and an output accuracy of each neural network.

30. The processing system of claim 26, wherein means for allocating computing resources to the plurality of neural networks based on the determined priority of each neural network comprises means for adjusting one or more hyperparameters of one or more of the plurality of neural networks based on the determined priority of the one or more the plurality of neural networks.

31. The processing system of claim 30, wherein means for adjusting one or more hyperparameters of one or more of the plurality of neural networks based on the determined priority of the one or more the plurality of neural networks comprises means for adjusting one or more hyperparameters based on a performance-effectiveness curve of one or more of the plurality of neural networks.

32. The processing system of claim 26, further comprising:

means for determining a performance of one or more of the plurality of neural networks using the allocated computing resources; and means for reallocating computing resources to one or more of the plurality of neural networks based on the determined performance of one or more of the plurality of neural networks.

33. The processing system of claim 32, further comprising:

means for monitoring a dynamic availability of the computing resources and an actual usage of the computing resources;

wherein means for reallocating computing resources to one or more of the plurality of neural networks based on the determined performance of one or more of the plurality of neural networks comprises means for reallocating computing resources to one or more of the plurality of neural networks based on the dynamic availability of the computing resources and the actual usage of the computing resources.

34. The processing system of claim 32, wherein means for reallocating computing resources to one or more of the plurality of neural networks based on the determined performance of one or more of the plurality of neural networks comprises means for readjusting one or more hyperparameters of one or more of the plurality of neural networks based on the determined performance of each of the plurality of neural networks.

35. The processing system of claim 26, further comprising:

means for determining whether available computing resources have increased, decreased, or remain the same;

means for adjusting one or more neural network hyperparameters that have a relatively greater effect on overall vehicle safety performance in response to determining that the available computing resources have increased; and means for adjusting one or more neural network hyperparameters that have a relatively less effect on overall vehicle safety performance in response to determining that the available computing resources have decreased.

* * * * *